United States Patent
Lin et al.

(10) Patent No.: US 8,749,891 B2
(45) Date of Patent: Jun. 10, 2014

(54) DIRECTIONAL LIGHT DISTRIBUTION OPTICAL ARRAY AND DIRECTIONAL LIGHT DISTRIBUTION OPTICAL MODULE

(75) Inventors: Hui-Hsiung Lin, Miaoli County (TW); Wen-Hsun Yang, Taipei (TW); Chin-Ju Hsu, Tainan (TW); Yu-Nan Pao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 113 days.

(21) Appl. No.: 13/315,817

(22) Filed: Dec. 9, 2011

(65) Prior Publication Data

US 2012/0147476 A1    Jun. 14, 2012

(30) Foreign Application Priority Data

Dec. 10, 2010   (TW) ................................ 99143296 A
Nov. 14, 2011   (TW) .............................. 100141462 A

(51) Int. Cl.
| | | |
|---|---|---|
| G02B 27/30 | (2006.01) | |
| G02B 13/18 | (2006.01) | |
| G02B 3/08  | (2006.01) | |
| F21V 5/00  | (2006.01) | |
| F21V 7/04  | (2006.01) | |

(52) U.S. Cl.
USPC ........... 359/641; 359/711; 359/741; 359/743; 362/326; 362/327; 362/617

(58) Field of Classification Search
USPC ......... 359/641, 708, 711, 712, 718, 719, 728, 359/793, 794, 800, 868, 869; 362/217.07, 362/97.2, 326–328, 330, 333, 339, 612, 362/618, 620, 617, 311.02, 16, 23.15, 555, 362/558; 313/504, 512; 396/176
See application file for complete search history.

(56) References Cited

U.S. PATENT DOCUMENTS

| | | | |
|---|---|---|---|
| 4,767,172 A | 8/1988 | Nichols et al. | |
| 4,770,514 A | 9/1988 | Silverglate | |

(Continued)

FOREIGN PATENT DOCUMENTS

| | | |
|---|---|---|
| CN | 201310816 Y | 9/2009 |
| EP | 2052181     | 3/2010 |

(Continued)

OTHER PUBLICATIONS

Xiaohui Ning et al., Dielectric totally internally reflecting concentrators, Applied Optics, Jan. 15, 1987, pp. 300-305, vol. 26, No. 2.

(Continued)

*Primary Examiner* — Loha Ben
(74) *Attorney, Agent, or Firm* — Muncy, Geissler, Olds & Lowe, P.C.

(57) ABSTRACT

The collimating optical element includes a light incident surface and a light emission curved surface. The light incident surface receives a light emitted by a light source. The light emission curved surface and a first plane are intersected to form a first curve. The first curve has a plurality of first curve segments, and each first curve segment includes at least three first tangent points. After passing each first tangent point along a connecting line of the light source and each first tangent point, the light exits along a first collimation axis, and an included angle formed between the first collimation axis and an optic axis is greater than −15° and smaller than −15°. Thus, the light after passing the collimating optical element forms a one-dimensional collimating light.

12 Claims, 19 Drawing Sheets

(56) References Cited

U.S. PATENT DOCUMENTS

| | | | |
|---|---|---|---|
| 5,485,317 A | 1/1996 | Perissinotto et al. | |
| 5,526,190 A | 6/1996 | Hubble, III et al. | |
| 5,742,438 A | 4/1998 | Conner et al. | |
| 5,757,557 A | 5/1998 | Medvedev et al. | |
| 5,894,195 A | 4/1999 | McDermott | |
| 6,078,752 A * | 6/2000 | Tenmyo | 396/176 |
| 6,102,545 A | 8/2000 | Ogino | |
| 6,400,905 B1 | 6/2002 | Tenmyo | |
| 6,473,238 B1 | 10/2002 | Daniell | |
| 6,547,423 B2 * | 4/2003 | Marshall et al. | 362/333 |
| 6,558,032 B2 | 5/2003 | Kondo et al. | |
| 6,974,236 B2 * | 12/2005 | Tenmyo | 362/340 |
| 7,333,276 B2 | 2/2008 | Ikuno et al. | |
| 7,580,192 B1 | 8/2009 | Chu et al. | |
| 7,619,836 B2 | 11/2009 | Minakawa et al. | |
| 7,674,031 B2 | 3/2010 | Sung et al. | |
| 7,706,073 B2 | 4/2010 | Munro | |
| 7,736,019 B2 | 6/2010 | Shimada et al. | |
| 7,837,359 B2 * | 11/2010 | Danek et al. | 362/309 |
| 8,434,914 B2 * | 5/2013 | Li et al. | 362/335 |
| 8,469,552 B2 * | 6/2013 | Moeller | 362/311.02 |
| 2002/0080615 A1 | 6/2002 | Marshall et al. | |
| 2006/0158902 A1 | 7/2006 | De Vaan | |
| 2007/0002452 A1 | 1/2007 | Munro | |
| 2008/0092879 A1 | 4/2008 | Minano Dominguez et al. | |
| 2009/0086498 A1 | 4/2009 | Condon et al. | |
| 2010/0097809 A1 | 4/2010 | Munro et al. | |
| 2010/0254545 A1 | 10/2010 | Hosomi | |

FOREIGN PATENT DOCUMENTS

| | | |
|---|---|---|
| TW | I254172 | 5/2006 |
| TW | 200743828 | 12/2007 |
| TW | 200909866 | 3/2009 |

OTHER PUBLICATIONS

W.-H. Yang et al., One Dimensional Coupler Lens for LED Collimation, IDW, 2010, pp. 813-816.

Wen-Hsun Yang et al., One Dimensional Coupler Lens for LED Collimation, ITRI, Dec. 2, 2010, pp. 1-12.

Parkyn et al., "Compact Non-Imaging Lens With Totally Internally Reflecting Facets", SPIE Non-Imaging Optics Maximum Efficiency Light Transfer, (1991), pp. 70-81, vol. 1528.

Deng et al., "Microlens Array for Stacked Laser Diode Beam Collimation", Proceedings of SPIE, (2005), pp. 666-670, vol. 5636, doi: 10.1117/12.575342.

Chang et al., "Nonspherical LED Packaging Lens for Uniformity Improvement", Optical Review, (2009), pp. 323-325, vol. 16, No. 3.

Parkyn et al., "Uniformly Illuminating Dual-Lens System for LED Collimation", Proceedings of SPIE, (2002), pp. 232-238, vol. 4446.

* cited by examiner

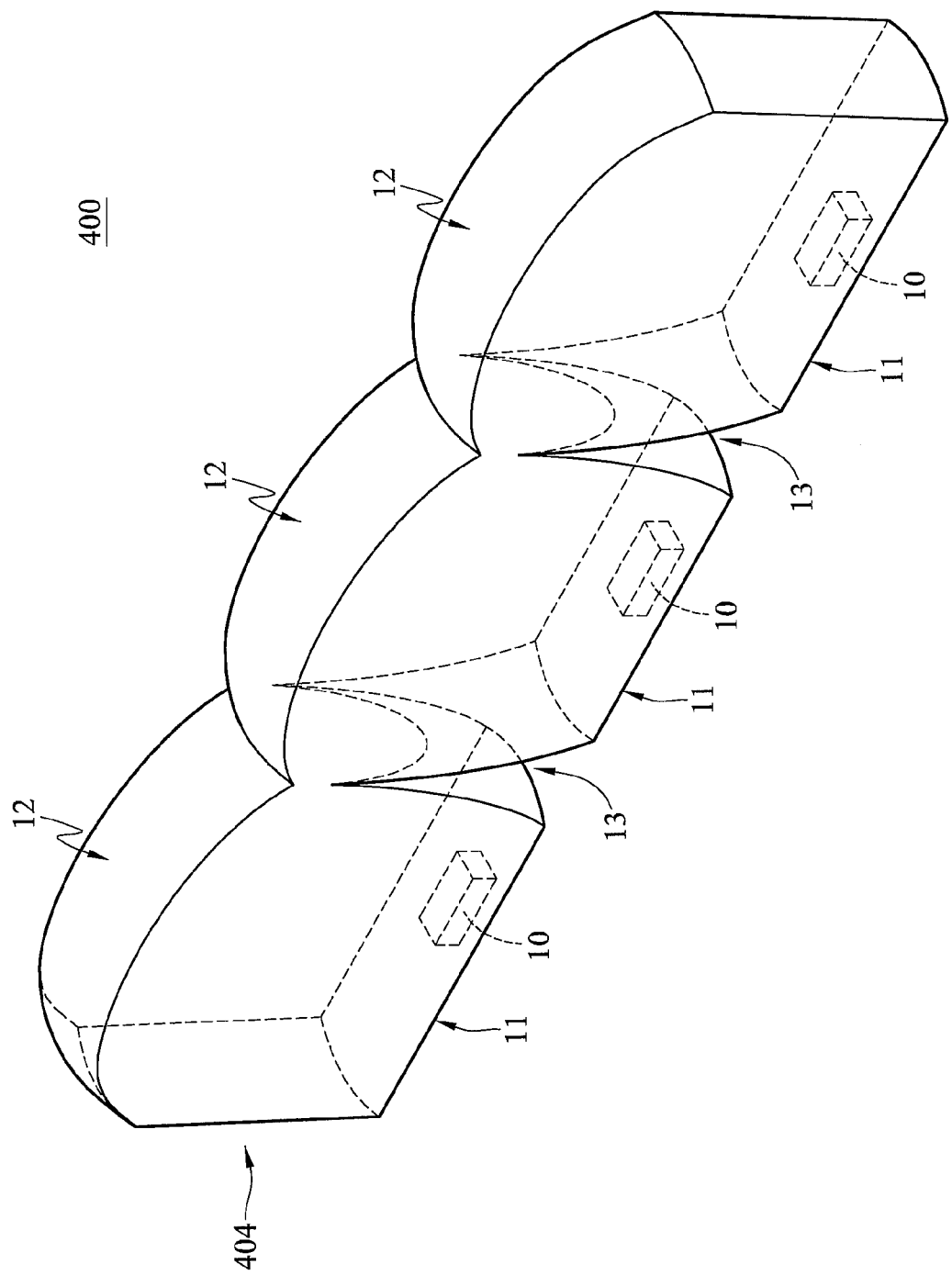

DIRECTIONAL LIGHT DISTRIBUTION OPTICAL ARRAY AND DIRECTIONAL LIGHT DISTRIBUTION OPTICAL MODULE

CROSS-REFERENCE TO RELATED APPLICATIONS

This non-provisional application claims priority under 35 U.S.C. §119(a) on Patent Application No(s). 099143296 filed in Taiwan, R.O.C. on Dec. 10, 2010 and Patent Application No(s). 100141462 filed in Taiwan, R.O.C. on Nov. 14, 2011, the entire contents of which are hereby incorporated by reference.

BACKGROUND

1. Technical Field

The technical field relates to optical element, optical assembly, optical array and optical module.

2. Related Art

Due to the advantages of light, thin, and low power consumption, the Liquid Crystal Display (LCD) is widely applied to portable electronic devices such as a notebook computer, a mobile phone, and a Personal Digital Assistant (PDA). However, the liquid crystal does not have the characteristic of luminescence, so the LCD needs a light-emitting device to realize the display function.

Currently, the color filter of the LCD in the prior art adopts the manner of absorbing and generating red, green, blue lights, and this manner will cause the substantial decrease of the using rate of the energy. To solve the above problem, a new LCD architecture design technique is gradually popularized.

Generally speaking, when a divergence angle of an incident light of a light source (hereinafter referred to as a backlight source for short) of a backlight module is too large, the light of various colors cannot be accurately incident on the subpixel of the liquid crystal to generate a color mixture phenomenon of a cross-talk (that is, the picture on a certain region of the display influencing the brightness of the adjacent region), such that the color saturation of the light after passing the panel is greatly reduced.

Since the backlight source in the LCD has a high requirement for collimation, the packaging technique of the general Light-Emitting Diode (LED) cannot meet the collimation requirement of the backlight source.

SUMMARY

Accordingly, the present disclosure provides a directional light distributing optical element, a directional light distributing optical assembly, a directional light distributing optical array, and a directional light distributing optical module.

According to the present disclosure, the directional light distributing optical element is used to receive a light emitted by a light source. The light source comprises an optic axis. In an embodiment, the directional light distributing optical element comprises a light incident surface and a light emission curved surface, and the light incident surface comprises a central axis and receives a light. The light emission curved surface and a first plane being vertical to the central axis are intersected to form a first curve. The first curve has a plurality of first curve segments, and each first curve segment comprises at least three first tangent points. After passing each first tangent point along a connecting line of a light source and each first tangent point, the light exits along a first axis. The included angle formed between the first axis and the optic axis is greater than −15° and smaller than 15°, and each first tangent point satisfies $$M_X = \tan\theta = \tan\left(\sin^{-1}\left(\frac{n_1}{n_2}\sin A_X\right)\right).$$

$M_x$ is a tangent slope at each first tangent point, $\theta$ is an included angle formed between the first axis and a normal line of each first tangent point, $A_x$ is an included angle formed between a connecting line of each first tangent point and a light source and the optic axis, $n_1$ is a refractive index of the directional light distributingoptical element, and $n_2$ is a refractive index of an ambient environment in which the directional light distributingoptical element is disposed.

In one embodiment, the directional light distributing optical assembly comprises at least one light source and a directional light distributing optical element. The light source comprises an optic axis and provides a light. The directional light distributing optical element comprises a light incident surface and a light emission curved surface, and the light incident surface comprises a central axis and receives a light. The light emission curved surface and a first plane being vertical to the central axis are intersected to form a first curve. The first curve has a plurality of first curve segments, and each first curve segment comprises at least three first tangent points. After passing each first tangent point along a connecting line of a light source and each first tangent point, the light exits along a first axis. The included angle formed between the first axis and the optic axis is greater than −15° and smaller than 15°, and each first tangent point satisfies:

$$M_X = \tan\theta = \tan\left(\sin^{-1}\left(\frac{n_1}{n_2}\sin A_x\right)\right).$$

$M_x$ is a tangent slope at each first tangent point, $\theta$ is an included angle formed between the first axis and a normal line of each first tangent point, $A_x$ is an included angle formed between a connecting line of each first tangent point and a light source and a optic axis, $n_1$ is a refractive index of the directional light distributing optical element, and $n_2$ is a refractive index of an ambient environment in which the directional light distributing optical element is disposed.

In one embodiment, the directional light distributing optical array is used to receive a plurality of first light beams and a plurality of second light beams emitted by a plurality of light sources. Each of the plurality of light sources comprises an optic axis. The directional light distributing optical element comprises a plurality of light incident surfaces, a plurality of light emission curved surfaces and a plurality of reflective structures. Each light incident surface comprises a central axis and individually receives the plurality of first light beams and the plurality of second light beams emitted by at least one light source. The plurality of light emission curved surfaces corresponds to the plurality of light incident surfaces individually.

Each light emission curved surface is intersected with a first plane being vertical to the central axes to form a first curve. Each first curve has a plurality of first curve segments, each first curve segment comprises at least three first tangent points, and after passing the corresponding first tangent point, each of the plurality of first light beams exits along a first axis. An included angle formed between the first axis and the optic axis is greater than −15° and smaller than 15°, and each first tangent point satisfies a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, θ is an included angle formed between the first axis and a normal line of each first tangent point, $A_x$ is an included angle formed between a connecting line of each first tangent point and the corresponding light source and the corresponding optic axis, $n_1$ is a refractive index of the directional light distributing optical array, and $n_2$ is a refractive index of an ambient environment in which the directional light distributing optical array is disposed.

The plurality of reflective strutures is formed between the two light incident surfaces which are adjacent to each other and used to receive and reflect the plurality of the second light beams from the plurality of light sources to the plurality of light emission curved surfaces. The plurality of light emission curved surfaces receives and reflects the plurality of the second light beams from the plurality of reflective strutures toward the plurality of light incident surfaces.

In one embodiment, the directional light distributing optical module comprises a plurality of light source and a directional light distributing optical array. The directional light distributing optical array is used to receive a plurality of first light beams and a plurality of second light beams emitted by a plurality of light sources. Each of the plurality of light sources comprises an optic axis. The directional light distributing optical array comprises a plurality of light incident surfaces, a plurality of light emission curved surfaces and a plurality of reflective structures. Each light incident surface comprises a central axis and individually receives the plurality of first light beams and the plurality of second light beams emitted by at least one light source.

Each light emission curved surface is intersected with a first plane being vertical to the central axes to form a first curve. Each first curve has a plurality of first curve segments, each first curve segment comprises at least three first tangent points, and after passing the corresponding first tangent point, each of the plurality of first light beams exits along a first axis. An included angle formed between the first axis and the optic axis is greater than −15° and smaller than 15°, and each first tangent point satisfies a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, θ is an included angle formed between the first axis and a normal line of each first tangent point, $A_x$ is an included angle formed between a connecting line of each first tangent point and the corresponding light source and the corresponding optic axis, $n_1$ is a refractive index of the directional light distributing optical array, and $n_2$ is a refractive index of an ambient environment in which the directional light distributing optical array is disposed.

The plurality of reflective strutures is formed between the two light incident surfaces which are adjacent to each other and used to receive and reflect the plurality of the second light beams from the plurality of light sources to the plurality of light emission curved surfaces. The plurality of light emission curved surfaces receives and reflects the plurality of the second light beams from the plurality of reflective strutures toward the plurality of light incident surfaces.

BRIEF DESCRIPTION OF THE DRAWINGS

The present disclosure will become more fully understood from the detailed description given herein below for illustration only, and thus are not limitative of the present disclosure, and wherein:

FIG. 10A is a schematic three-dimensional view of a directional light distributing optical module according to another embodiment;

DETAILED DESCRIPTION

Figure 1A:
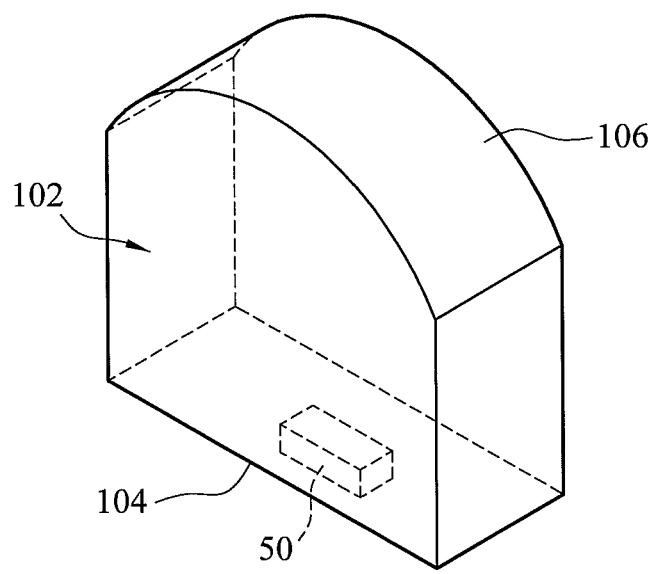
FIG. 1A is a schematic three-dimensional view of a directional light distributing optical assembly according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1A is a schematic three-dimensional view of a directional light distributing optical assembly according to an embodiment. The directional light distributing optical assembly 100 comprises a light source 50 and a directional light distributing optical element 102. The number of the light source 50 may be but not limited to one, and the number of the light source may be adjusted according to the actual requirement. The light source 50 comprises an optic axis 51 (see FIG. 1C) for providing a light 52, and the directional light distributing optical element 102 is used to receive the light 52 emitted by the light source 50. The directional light distributing optical element 102 comprises a light incident surface 104 and a light emission curved surface 106.

Figure 1B:
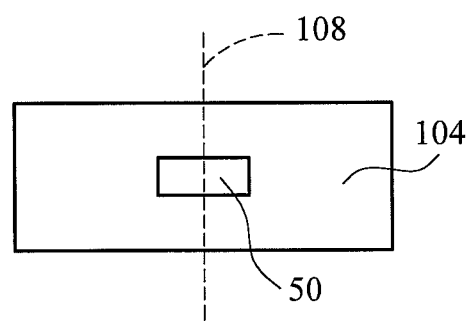
FIG. 1B is a schematic structural bottom view of FIG. 1A.
Figure 1C:
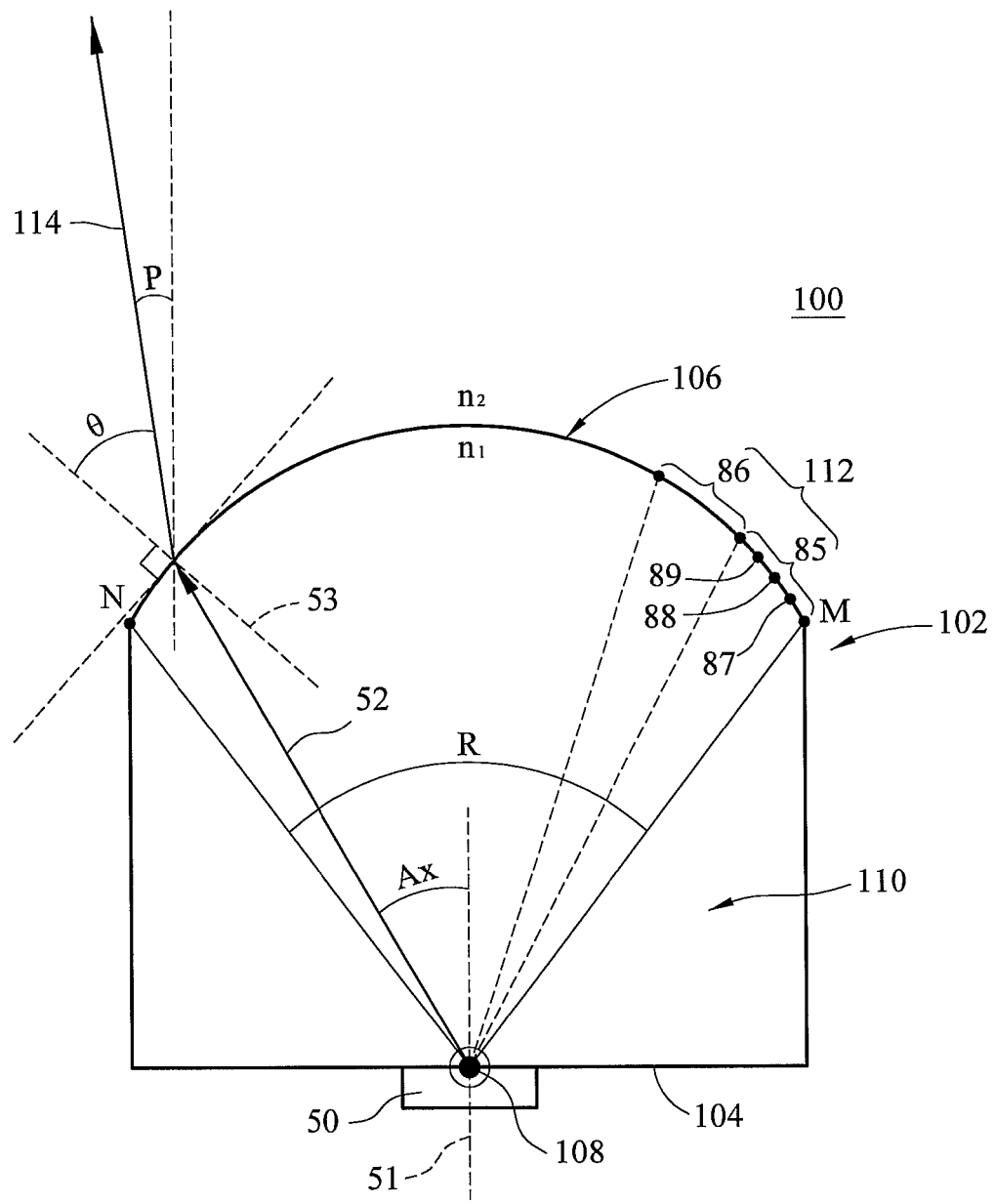
FIG. 1C is a schematic structural side view of FIG. 1A.

FIG. 1B and FIG. 1C are a schematic structural bottom view and a schematic structural side view of FIG. 1A. The light incident surface 104 comprises a central axis 108, and the light source 50 may be disposed on the central axis 108. The light source 50 emits the light 52, and the light incident surface 104 receives the light 52. In this embodiment, the light source 50 may be in contact with the light incident surface 104, which is not intended to limit the present disclosure, that is, the light source 50 may be separated from a light incident surface 104 for a distance.

The light emission curved surface 106 and a first plane 110 to which the central axis 108 is vertical are intersected to form a first curve 112. The first curve 112 has a plurality of first curve segments 85, 86, and each first curve segment (that is, the first curve segments 85, 86) comprises at least three first tangent points. For example, the first curve segment 85 comprises first tangent points 87, 88, 89. To avoid the complexity of FIG. 1C, only two first curve segments 85, 86 and first tangent points 87, 88, 89 are shown in FIG. 1C. In this embodiment, the first curve 112 is obtained in a curve fitting manner of the first tangent points which are taken at an interval of a predetermined degree. The predetermined degree may be but not limited to 1°, which is not intended to limit the present disclosure. After passing each first tangent point along a connecting line of the light source 50 and each first tangent point, the light 52 exits along a first axis 114. An included angle P formed between the first axis 114 and the optic axis 51 is greater than −15° and smaller than 15°, and each first tangent point satisfies a formula (1) in the following:

$$M_x = \tan\theta = \tan\left(\sin^{-1}\left(\frac{n_1}{n_2}\sin A_x\right)\right) \quad (1)$$

$M_x$ is a tangent slope (that is, tan θ) at each first tangent point, θ is an included angle formed between the first axis 114 and a normal line 53 of each first tangent point, $A_x$ is an included angle formed between a connecting line of each first tangent point and a light source 50 and the optic axis 51, $n_1$ is a refractive index of the directional light distributing optical element 102, and $n_2$ is a refractive index of an ambient environment in which the directional light distributing optical element 102 is disposed. An included angle R formed between end points M, N of the first curve 112 and a light source 50 may be greater than 0°, and smaller than or equal to 100° (that is, 0°<R≤100°).

Figure 1D:
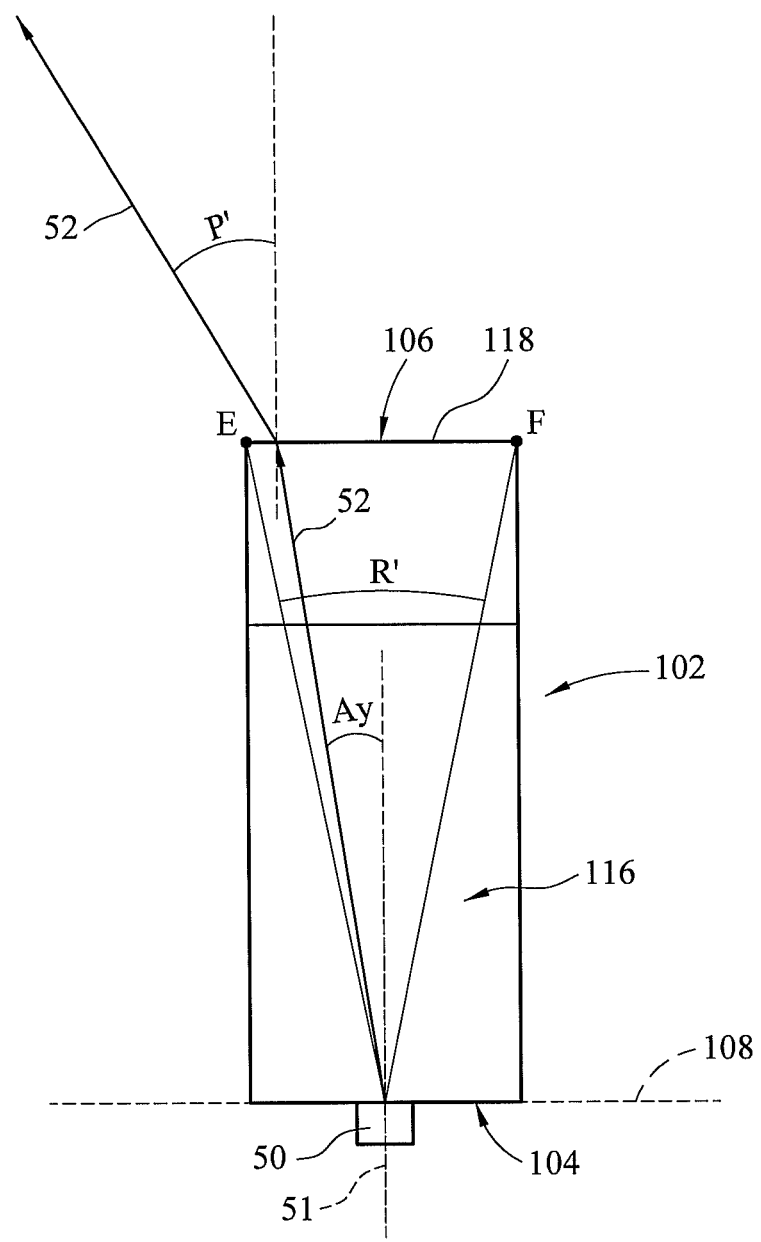
FIG. 1D is another schematic structural side view of FIG. 1A.

In this embodiment, the light emission curved surface 106 may be formed by the first curve 112 extending along the central axis 108. FIG. 1D is another schematic structural side view of FIG. 1A. The light emission curved surface 106 and a second plane 116 at which the central axis 108 is located are intersected to form a second curve 118, and an included angle R' formed between two end points E, F of the second curve 118 and a light source 50 is greater than 0° and smaller than 40°. In this embodiment, the light emission curved surface 106 may be formed by the first curve 112 extending along central axis 108, such that the second curve 118 is a straight line, and thus an included angle P' formed between the light 52 after passing through the second curve 118 and the optic axis 51 may be greater than or equal to 30°. Therefore, the light 52 after passing the directional light distributing optical assembly 100 may generate a one-dimensional directional light distributing light.

Figure 2:
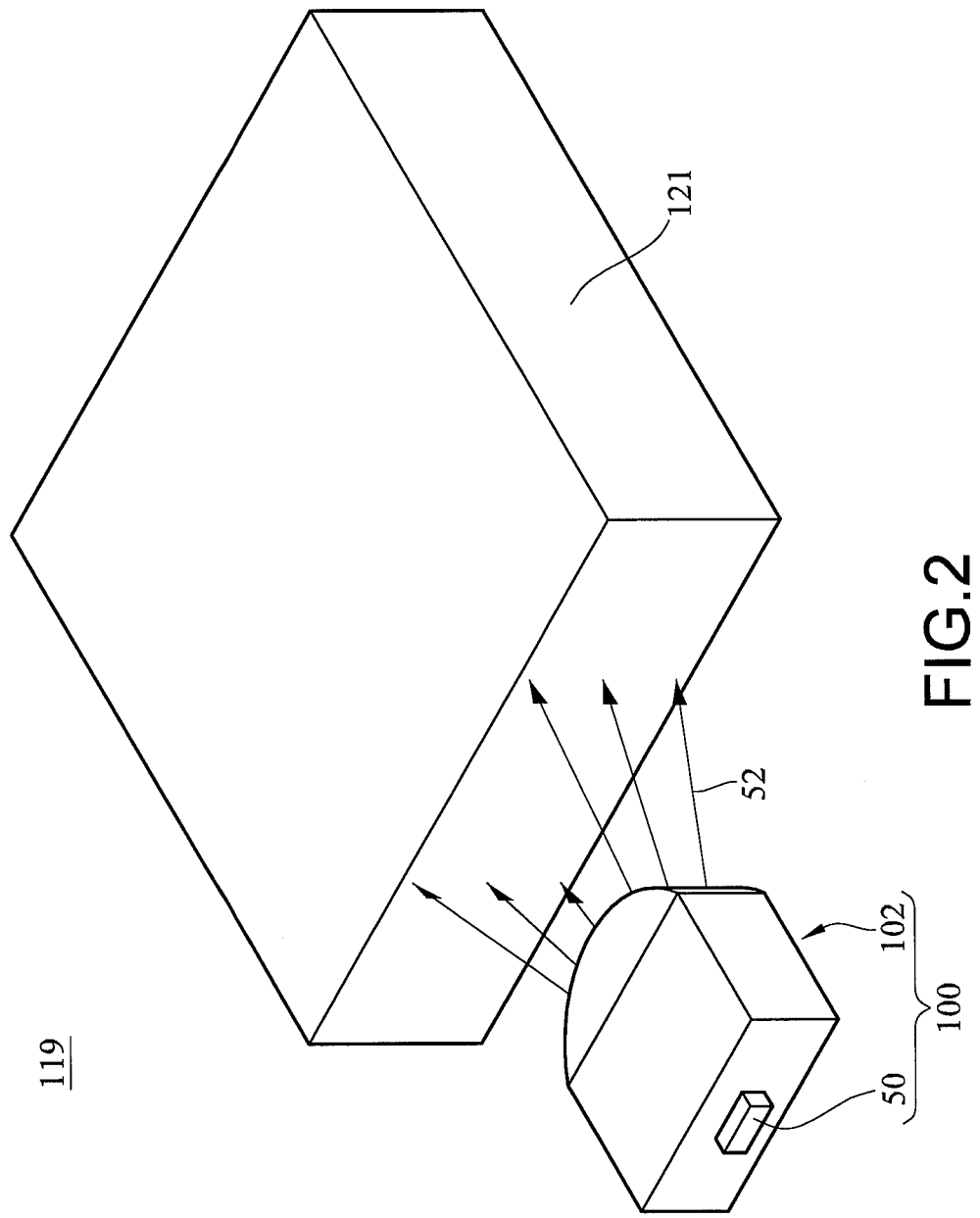
FIG. 2 is a schematic three-dimensional structural view of a directional light distributing optical assembly of FIG. 1A when being applied to a side-type backlight module according to an embodiment.

Referring to FIG. 1C, FIG. 1D, and FIG. 2, FIG. 2 is a schematic three-dimensional structural view of a directional light distributing optical assembly of FIG. 1A when being applied to a side-type backlight module. When the directional light distributing optical assembly 100 is used as the light source of the side-type backlight module 119, an included angle P formed between the light 52 after passing the first curve 112 and the optic axis 51 is greater than −15° and smaller than 15°, and the included angle P' formed between the light 52 after passing the second curve 118 and the optic axis 51 may be greater than or equal to 30°, such that the light 52 after entering a light collimation guide plate 121 of the side-type backlight module 119 may generate a uniform illumination. The included angle P is greater than −15° and smaller than 15°, such that the light 52 is collimatedly incident on the light collimation guide plate 121, and the included angle P' is greater than or equal to 30°, such that the side-type backlight module 119 outputs the uniform illumination.

Figure 3:
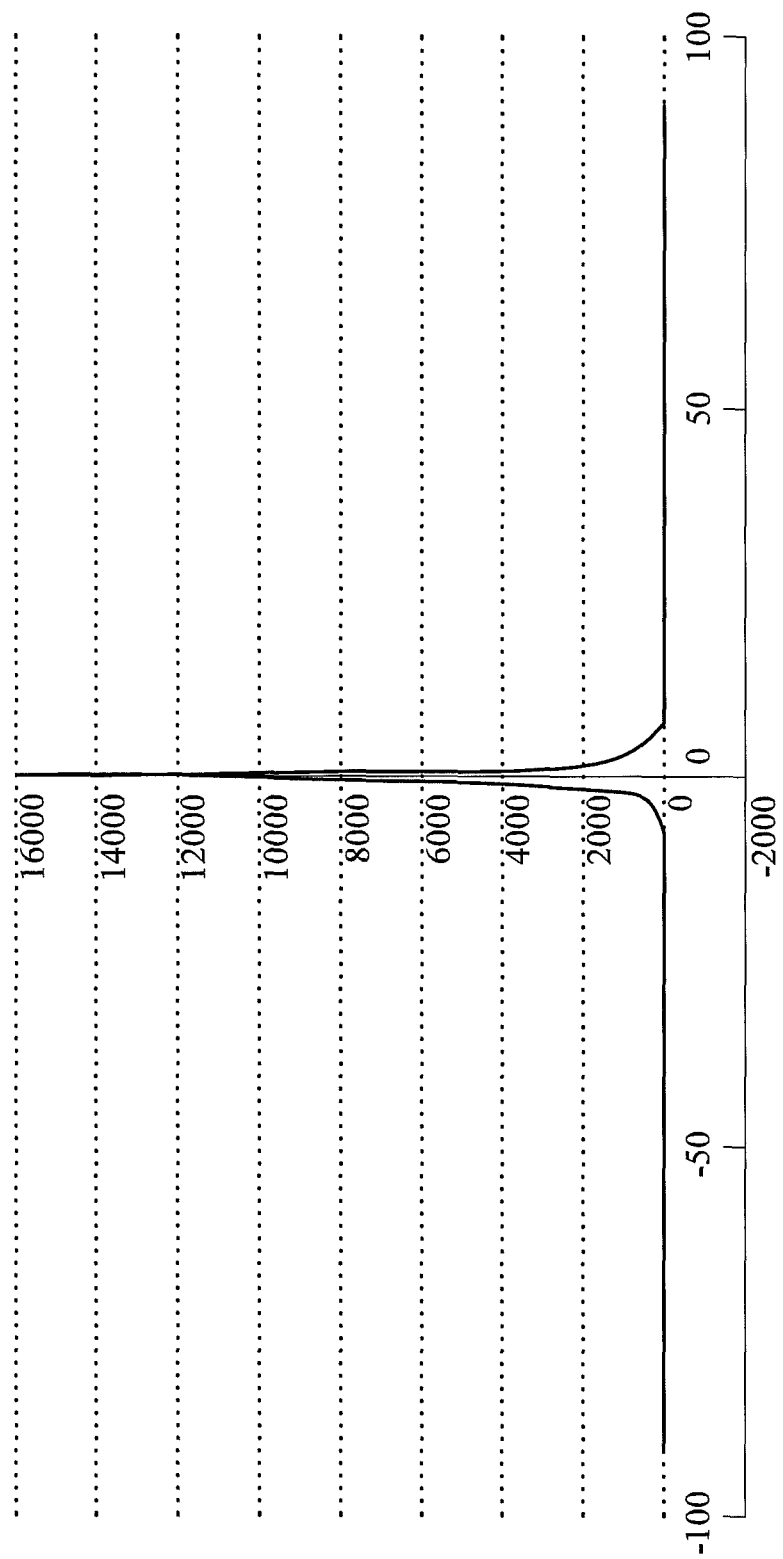
FIG. 3 is a schematic view of a relation of a view angle and a light intensity simulated according to FIG. 1A.
Figure 4:
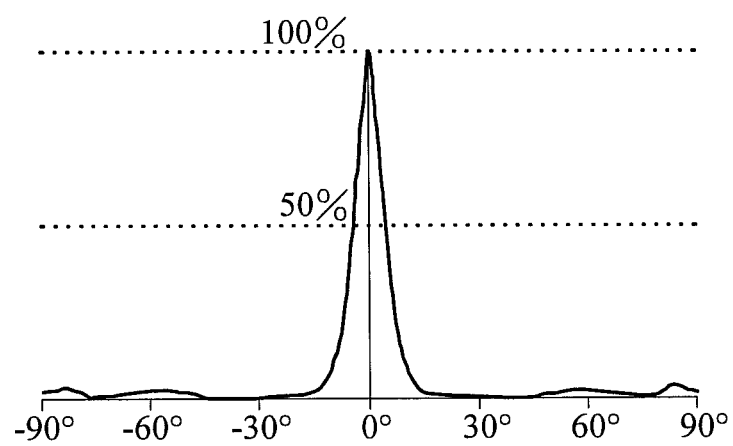
FIG. 4 is a schematic view of a relation of an view angle and a light intensity experimented according to FIG. 1A.

The following experiment is carried out according to FIG. 2. FIG. 3 and FIG. 4 are respectively schematic views of a relation of a view angle and a light intensity simulated and experimented according to FIG. 2. The schematic view of the relation of the view angle and the light intensity is obtained by the measurement of the light intensity at different view angles after the light 52 passes the directional light distributing optical element 102 and the light collimation guide plate 121. From FIG. 3, it is known that the Full Width at Half Maximum (FWHM) of FIG. 3 is 1.8° (that is, the simulated FWHM of the directional light distributing optical assembly is 1.8°). From FIG. 4, the FWHM of FIG. 4 is 9.09° (that is, the practical FWHM of the directional light distributing optical assembly is 9.09°). It is known from the above that under the same parameters, the practically experimented and simulated FWHMs have great difference, and the error may be caused by the alignment relation of the light source 50 and the directional light distributing optical element 102, which is for example but not limited to the distance between the directional light distributing optical element 102 and the light source 50 or whether the optic axis 51 of the light source 50 and the optic axis (not shown) of the directional light distributing optical element 102 are located on the same plane vertical to the central axis 108.

Figure 5A:
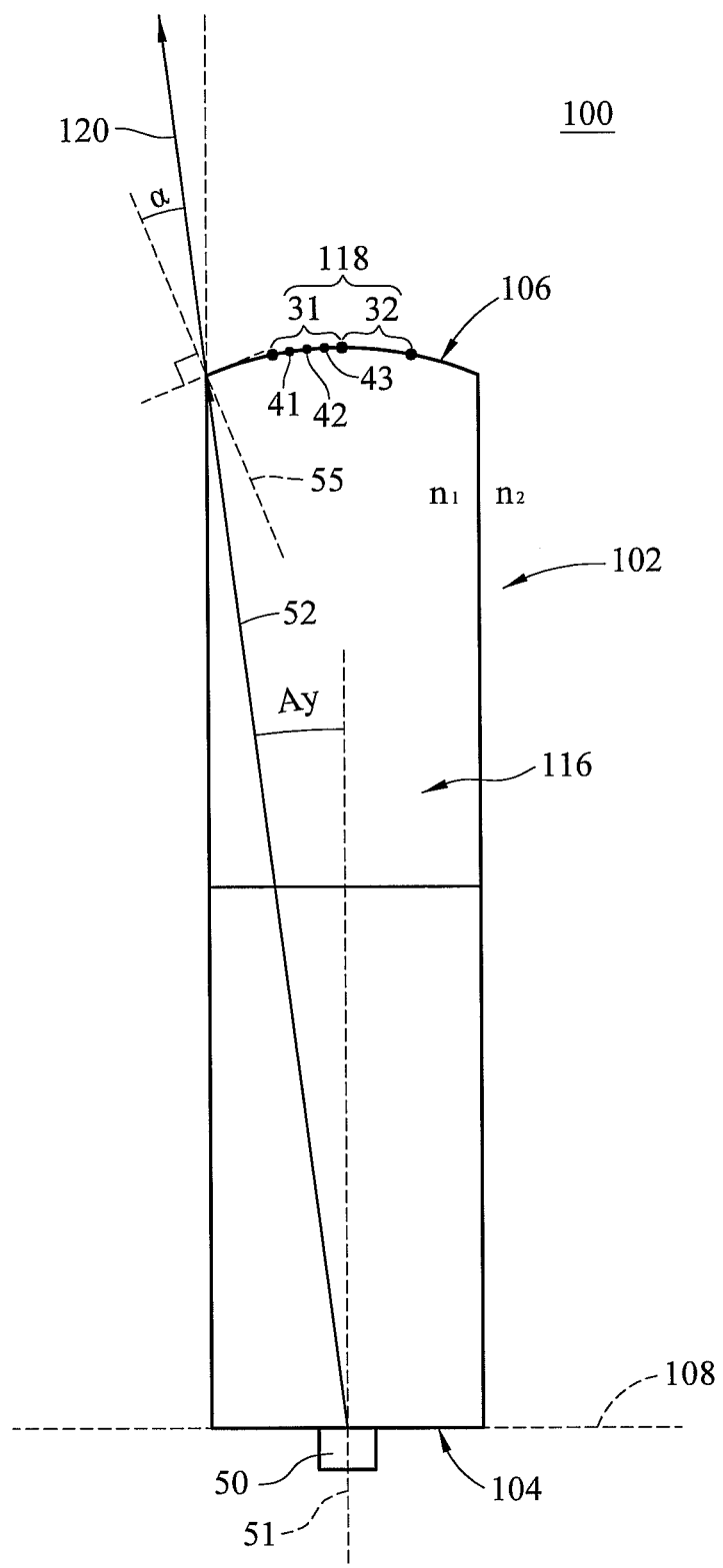
FIG. 5A is a schematic structural side view of a directional light distributing optical assembly according to another embodiment.
Figure 5B:
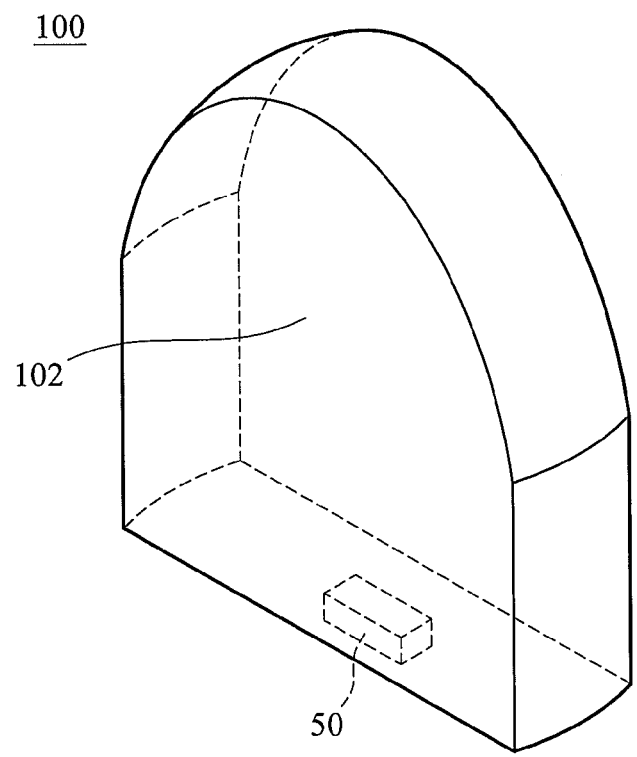
FIG. 5B is a schematic three-dimensional structural view of a directional light distributing optical assembly according to another embodiment.

To reduce the difference between the practically experimented and simulated FWHMs, the influence of the relative relation of the light source 50 and the directional light distributing optical element 102 may be reduced, that is, the second curve 118 of the light emission curved surface 106 is processed. FIG. 5A and FIG. 5B are respectively a schematic structural side view and a schematic three-dimensional structural view of a directional light distributing optical assembly according to another embodiment. The second curve 118 has a plurality of second curve segments 31, 32, and each second curve segment (that is, the second curve segments 31, 32) comprises at least three second tangent points. For example, the second curve segment 31 comprises second tangent points 41, 42, 43. To avoid the complexity of FIG. 5A and FIG. 5B, only two second curve segments 31, 32 and second tangent points 41, 42, 43 are shown in FIG. 5A and FIG. 5B. In this embodiment, the second curve 118 is obtained in a curve fitting manner of the second tangent points which are taken at an interval of a predetermined degree. The predetermined degree may be but not limited to 1°, which is not intended to limit the present disclosure. After passing each second tangent point along a connecting line of the light source 50 and each second tangent point, the light 52 exits along a second axis 120. An included angle formed between the second axis 120 and the optic axis 51 is greater than or equal to 30°, but is not limited to this. All the tangent points on each second curve satisfy a formula (2) in the following:

$$M_y = \tan\alpha = \tan\left(\sin^{-1}\left(\frac{n_1}{n_2}\sin A_y\right)\right) \quad (2)$$

$M_y$ is a tangent slope (that is, tan α) at each second tangent point on the second curve 118, α is an included angle formed between the second axis 120 and a normal line 55 of each second tangent point, $A_y$ is an included angle formed between a connecting line of each second tangent point on the second curve 118 and a light source 50 and the optic axis 51, $n_1$ is a refractive index of the directional light distributing optical element 102, and $n_2$ is a refractive index of an ambient environment in which the directional light distributing optical element 102 is disposed.

Figure 6:
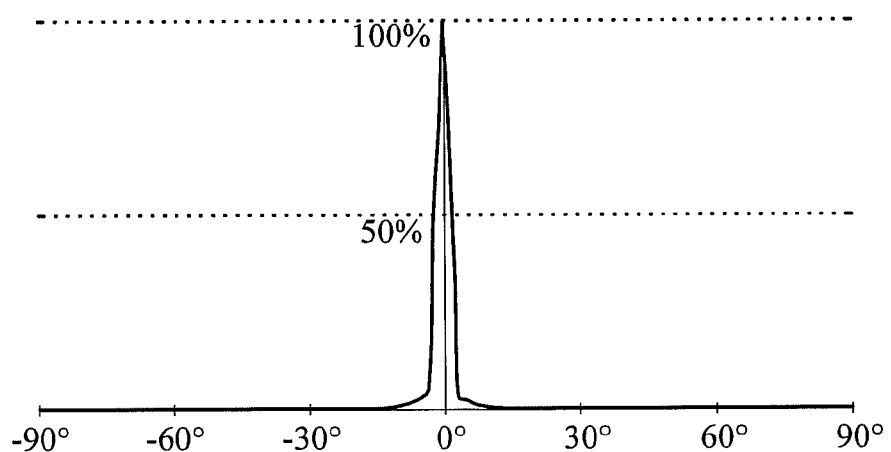
FIG. 6 is a schematic view of a relation of a view angle and a light intensity when the directional light distributing optical assembly of FIG. 5A is used to carry out the experiment.

Then, FIG. 6 is a schematic view of a relation of a view angle and a light intensity when the directional light distributing optical assembly of FIG. 5A is used to carry out the experiment. From FIG. 6, it is known that the FWHM of FIG. 6 is 3.89°. Therefore, it is known that when the second curve 118 changes from the straight line in FIG. 1D into the curve in FIG. 5A, the difference between the practically experimented and the simulated FWHMs may be effectively reduced and the alignment accuracy of the light source 50 and the directional light distributing optical element 102 may be improved.

Furthermore, to reduce the size of the directional light distributing optical element 102, the directional light distributing optical element 102 may be designed into the Fresnel lens shape. The detailed description may refer to FIG. 7A, FIG. 7B, and FIG. 7C, which are respectively a schematic three-dimensional structural view of a directional light distributing optical assembly according to another embodiment, a schematic structural bottom view and a schematic structural side view of FIG. 7A. In this embodiment, the light sources 60, 70, 80 may be disposed on the central axis 108, in which the light source 60 may emit a red light, the light source 70 may emit a green light, and the light source 80 may emit a blue light, such that the directional light distributing optical assembly 300 may emit a white light, which is not intended to limit the present invention. It should be noted that each light source (that is, the light sources 60, 70, 80) needs to be disposed on the central axis 108 to avoid influencing the collimation of the directional light distributing optical assembly 300. In the following description of the light, the light 72 emitted by the light source 70 is taken as an example, and the lights emitted by the light sources 60, 80 may be deduced in the same manner.

Figure 7A:
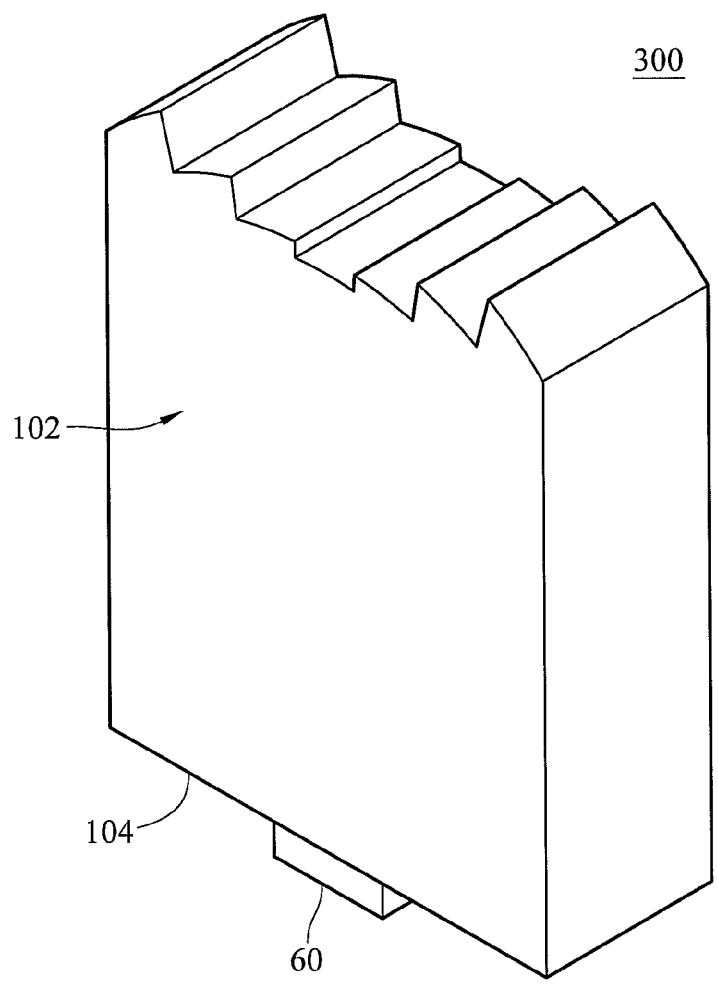
FIG. 7A is a schematic three-dimensional structural view of a directional light distributing optical assembly according to another embodiment.
Figure 7B:
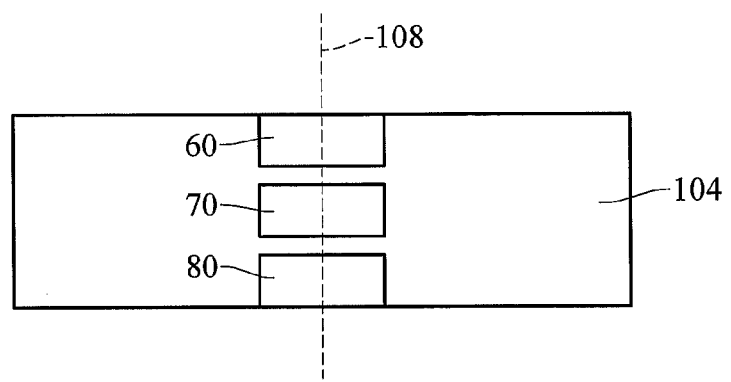
FIG. 7B is a schematic structural bottom view of FIG. 7A.
Figure 7C:
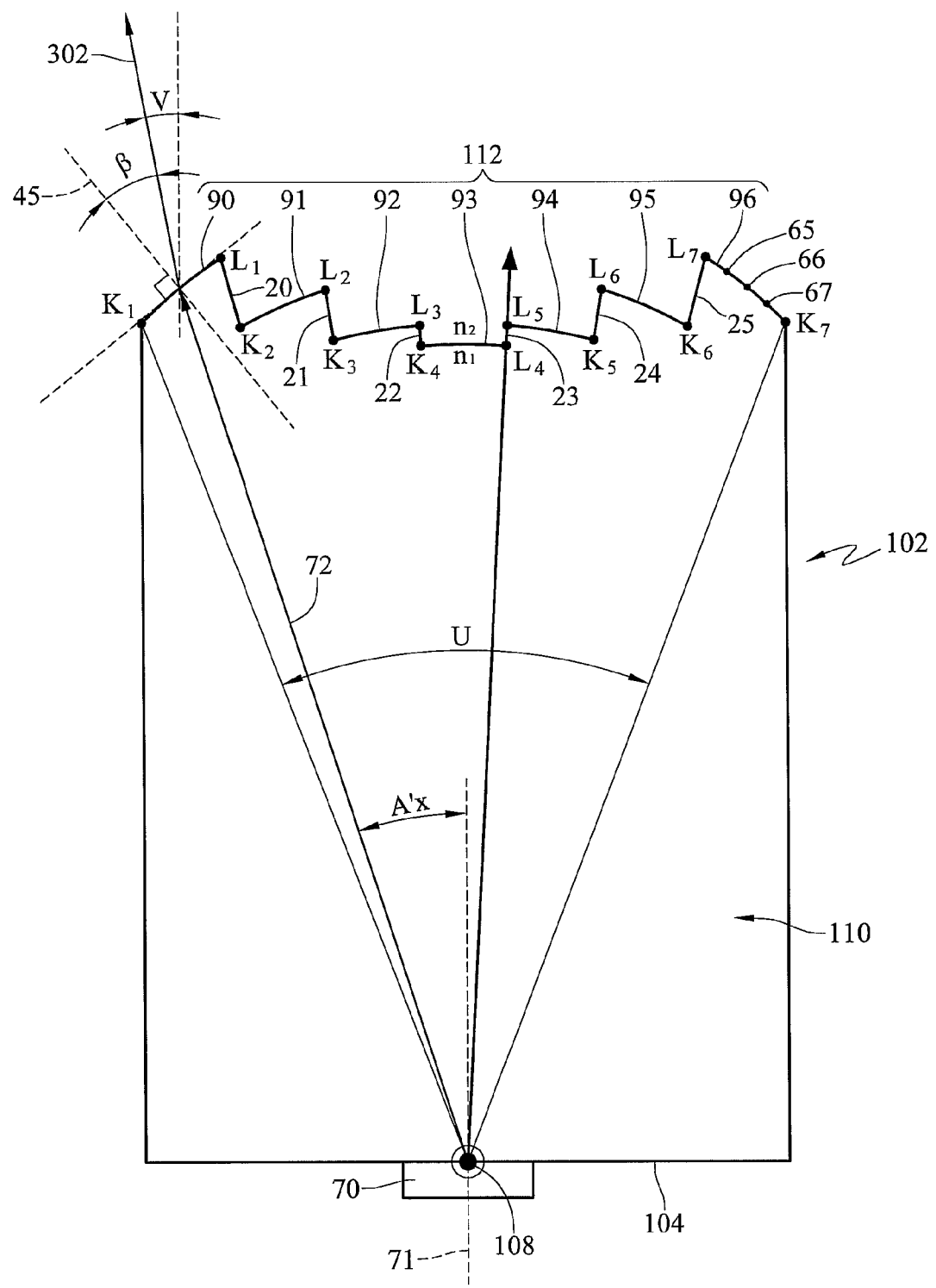
FIG. 7C is a schematic structural side view of FIG. 7A.

Referring to FIG. 7A and FIG. 7C, the directional light distributing optical assembly 300 comprises a structure of directional light distributing optical assembly 100. The first curve 112 comprises seven first curve segments 90, 91, 92, 93, 94, 95, 96, and each first curve segment (that is, the first curve segments 90, 91, 92, 93, 94, 95, 96) comprises at least three first tangent points. For example, the first curve segment 96 comprises first tangent points 65, 66, 67 (to avoid the complexity of the drawings, the first tangent points on the first curve segments 90, 91, 92, 93, 94, 95 are not marked in FIG. 7C). After passing each first tangent point along a connecting line of the light source 70 and each first tangent point, the light 72 exits along the first axis 302. The included angle V formed between the first axis 302 and an optic axis 71 is greater than −15° and smaller than 15°, and each first tangent point satisfies a formula (3) in the following:

$$M'_x = \tan\beta = \tan\left(\sin^{-1}\left(\frac{n_1}{n_2}\sin A'_x\right)\right) \quad (3)$$

$M'_x$ is a tangent slope (that is, tan β) at each first tangent point, β is an included angle formed between a first axis 302 and a normal line 45 of each first tangent point, $A'_x$ is an included angle formed between a connecting line of each first tangent point and a light source 70 and the optic axis 71, $n_1$ is a refractive index of the directional light distributing optical element 102, and $n_2$ is a refractive index of an ambient environment in which the directional light distributing optical element 102 is disposed. An included angle U formed between end points $K_1$, $K_7$ of the first curve 112 and a light source 70 may be greater than 0°, and smaller than or equal to 100° (that is, 0°<U≤100°).

The included angle between the connecting lines of two end points of each first curve segment and a light source 70 is greater than 0° and smaller than 15°. That is to say, the included angle between connecting lines of end points $K_1$, $L_1$ of the first curve segment 90 and the light source 70 is 6°. The included angle between connecting lines of end points $K_2$, $L_2$ of the first curve segment 91 and a light source 70 is 6°. The included angle between the connecting lines of end points $K_3$, $L_3$ of the first curve segment 92 and the light source 70 is 6°. The included angle between the connecting lines of end points $K_4$, $L_4$ of the first curve segment 93 and the light source 70 is 6°. The included angle between the connecting lines of end points $K_5$, $L_5$ of the first curve segment 94 and the light source 70 is 6°. The included angle between the connecting lines of end points $K_6$, $L_6$ of the first curve segment 95 and a light source 70 is 6°. The included angle between the connecting lines of end points $K_7$, $L_7$ of the first curve segment 96 and the light source 70 is 6°, which is not intended to limit the present disclosure. In practice, the included angle between the connecting lines of two end points of each first curve segment and the light source 70 may be adjusted according to the actual requirement. It should be noted that an included angle U formed between end points $K_1$, $K_7$ of the first curve 112 and a light source 70 may be greater than 0°, and smaller than or equal to 100° (that is, 0°<U≤100°).

In this embodiment, the first curve 112 may further comprise six connecting segments 20, 21, 22, 23, 24, 25, and each connecting segment (that is, the connecting segments 20, 21, 22, 23, 24, 25) connects two adjacent first curve segments. That is to say, the connecting segment 20 connects the first curve segment 90 and the first curve segment 91 (that is, the end points $L_1$ and $K_2$). The connecting segment 21 connects the first curve segment 91 and the first curve segment 92 (that is, the end points $L_2$ and $K_3$). The connecting segment 22 connects the first curve segment 92 and the first curve segment 93 (that is, the end points $L_3$ and $K_4$). The connecting segment 23 connects the first curve segment 93 and the first curve segment 94 (that is, the end points $L_4$ and $L_5$). The connecting segment 24 connects the first curve segment 94 and the first curve segment 95 (that is, the end points $K_5$ and $L_6$). The connecting segment 25 connects the first curve segment 95 and the first curve segment 96 (that is, the end points $K_6$ and $L_7$). Each connecting segment (that is, the connecting segments 20, 21, 22, 23, 24, 25) is substantially parallel to the connecting line of an end point of each connecting segment (that is, the connecting segments 20, 21, 22, 23, 24, 25) and the light source 70. In other words, the connecting segment 20 is substantially parallel to the connecting line of the end point $K_2$ and the light source 70. The connecting segment 21 is substantially parallel to the connecting line of the end point $K_3$ and the light source 70. The connecting segment 22 is substantially parallel to the connecting line of the end point $K_4$ and the light source 70. The connecting segment 23 is substantially parallel to the connecting line of the end point $L_4$ and the light source 70. The connecting segment 24 is substantially parallel to the connecting line of the end point $K_5$ and the light source 70. The connecting segment 25 is substantially parallel to the connecting line of the end point $K_6$ and the light source 70.

The material of the directional light distributing optical element 102 may be Polyethylene terephthalate (PET), Polymethyl methacrylate (PMMA), Poly-Styrenics (PS), Poly Carbonate (PC), or glass, and may also be adjusted according to the actual requirement.

The directional light distributing optical element according to the above-mentioned embodiments may use the design of the light emission curved surface to make the light emitted by the light source pass the directional light distributing optical element and then generate a one-dimensional directional light distributing light. The design of second curve may reduce the alignment error of the light source and the directional light distributing optical element and may further reduce the FWHM of the directional light distributing optical assembly. The light emission curved surface is designed into the Fresnel lens to reduce the volume of the directional light distributing optical element, such that the directional light distributing optical assembly may be applied to the small devices.

Figure 8A:
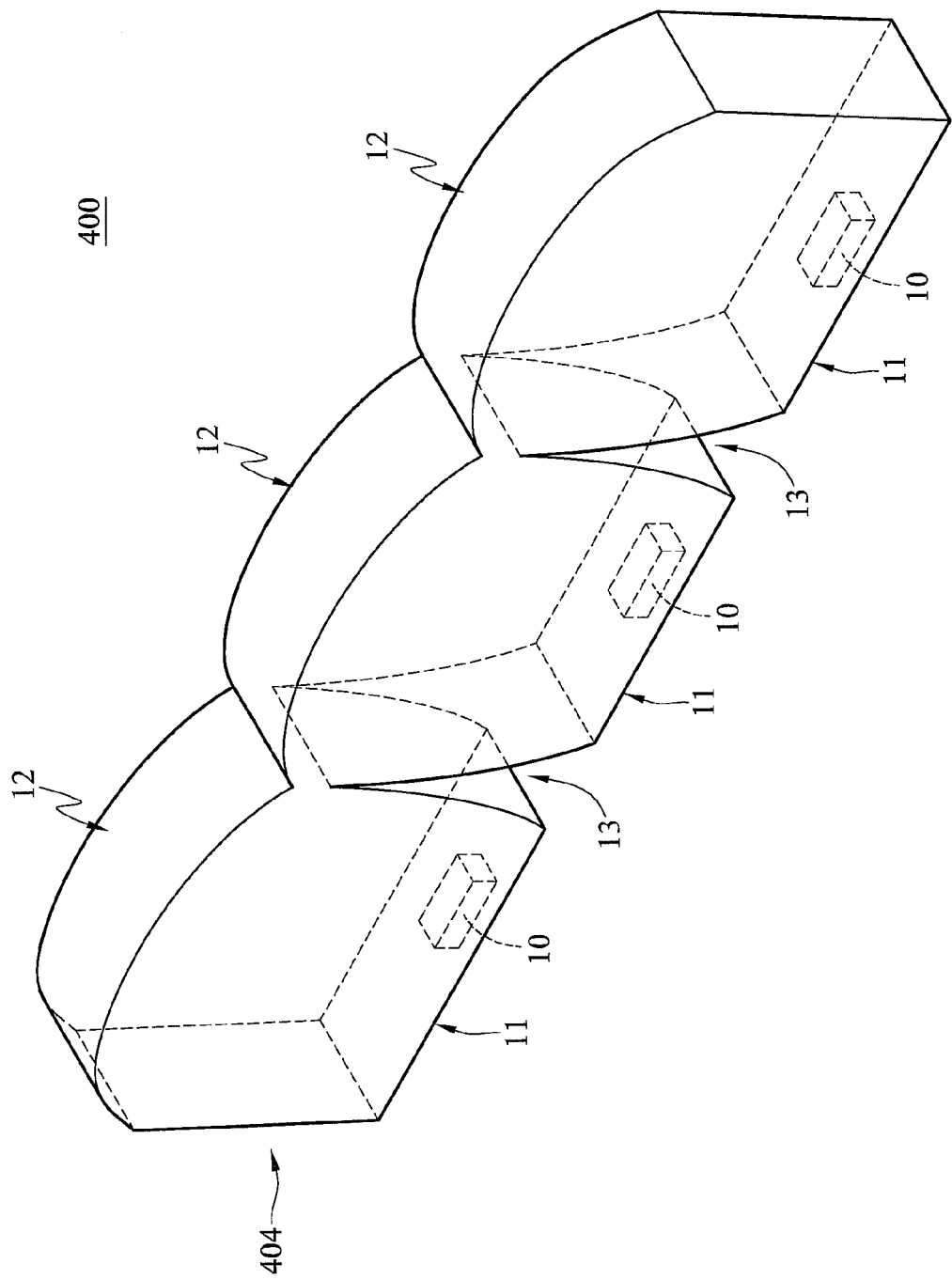
FIG. 8A is a schematic three-dimensional view of a directional light distributing optical module according to an embodiment.

FIG. 8A is a schematic three-dimensional view of a directional light distributing optical module according to an embodiment. The directional light distributing optical module 400 is used to receive a plurality of first light beams 75 and a plurality of second light beams 76 emitted by a plurality of light sources 10. In this embodiment, the directional light distributing optical module 400 can comprise three light sources 10 and a directional light distributing optical array 404, and each light source 10 comprises an optical axis 47 (referring to FIG. 9A). The directional light distributing optical array 404 can comprise three light incident surfaces 11, three light emission curved surfaces 12 and two reflective structures 13. Each light incident surface 11 individually corresponds to one light source 10, three light emission curved surfaces 12 individually corresponds to three light incident surfaces 11, and each reflective structure 13 is formed between the two light incident surfaces 11 which are adjacent to each other, which is not intended to limit the present disclosure.

For example, the number of the light source 10 is six, the number of light incident surface 11 is four, the number of light emission curved surface 12 is four, and the number of reflective structure 13 is three, wherein the two light incident surfaces 11 correspond to the two light sources 10 respectively, another two light incident surfaces 11 correspond to one light source 10 respectively, the four light incident surfaces 11 correspond to the four light emission curved surface 12, and each reflective structure 13 is formed between the two light incident surfaces 11 which are adjacent to each other. Each light incident surface 11 comprises a central axis 14. When one light incident surfaces 11 corresponds to two light source 10, the two light source 10 can be disposed on the central axis 14 of the corresponding light incident surfaces 11 (referring to FIG. 8B), one of the two light source 10 can emit a yellow light, another light source 10 can emit a blue light, so that the corresponding light emission curved surface 12 can emit a white light, which is not intended to limit the present disclosure.

It is noted that all light source 10 included in the directional light distributing optical module 400 can be disposed on the central axis 14 of the corresponding light incident surfaces 11 to avoid influencing the collimation of the directional light distributing optical module 400. Moreover, the number of light incident surface 11 is equal to the number of light emission curved surface 12, the number of light source 10 is greater than or equal to the number of light incident surface 11, and the number of light incident surface 11 minus the number of reflective structure 13 leaves one.

Figure 8B:
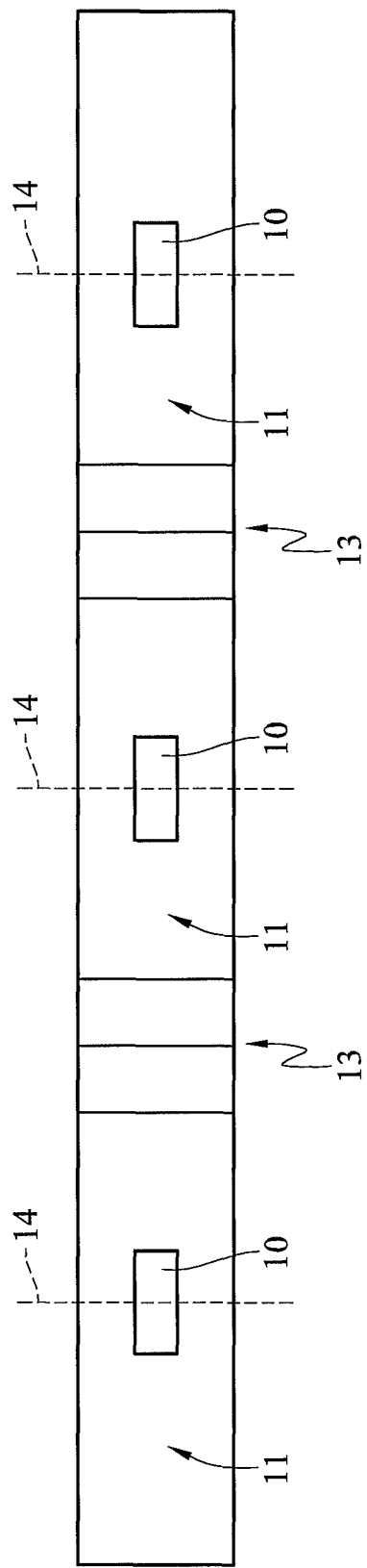
FIG. 8B is a schematic structural bottom view of FIG. 8A.

FIG. 8B is a schematic structural bottom view of FIG. 8A. Referring to FIG. 8A and FIG. 8B, each light incident surface 11 comprises the central axis 14, and each light source 10 may be disposed on the central axis 14 of the corresponding light incident surface 11. Each light source 10 emits the plurality of first light beams 75 (referring to FIG. 9A) and the plurality of second light beams 76 (referring to FIG. 9A). Each light incident surface 11 receives the plurality of first light beams 75 and the plurality of second light beams 76 from one light source 10. In this embodiment, the three light sources 10 may be in contact with the three light incident surfaces 11 respectively, which is not intended to limit the present disclosure. For example, the three light sources 10 may be separated from the three light incident surfaces 11 for a distance respectively, or one of the three light sources 10 can be separated from the corresponding light incident surface 11 and the other light sources 10 can be in contact with the other light incident surfaces 11 respectively.

In this embodiment, since the relationship between the three light sources 10, the three light incident surfaces 11, the three light emission curved surfaces 12 and the two reflective structures 13 is equal to the relationship between one light source 10, the corresponding light incident surface 11, corresponding light emission curved surface 12 and corresponding reflective struture 13, so the following description takes the relationship between one light source 10, the corresponding light incident surface 11, corresponding light emission curved surface 12 and corresponding reflective struture 13 as an example.

Figure 9A:
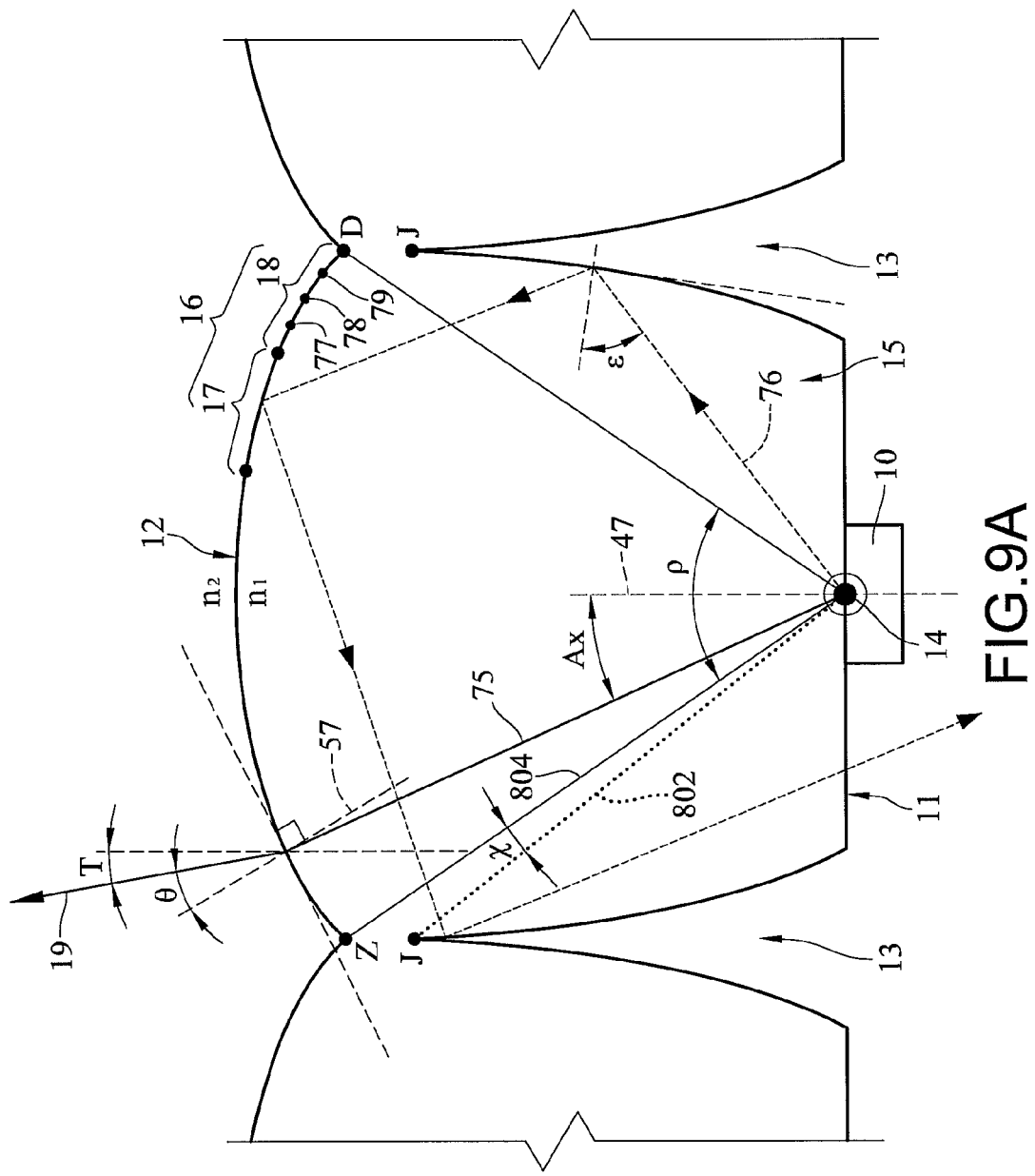
FIG. 9A is a schematic structural side view of one light source, corresponding light incident surface, corresponding light emission curved surface and corresponding reflective struture according to an embodiment of FIG. 8A.

FIG. 9A is a schematic structural side view of one light source, corresponding light incident surface, corresponding light emission curved surface and corresponding reflective struture according to an embodiment of FIG. 8A. Referring to FIG. 9A, the light emission curved surface 12 and a first plane 15 to which the central axis 14 is vertical are intersected to form a first curve 16. The first curve 16 has a plurality of first curve segments 17, 18, and each first curve segment (that is, the first curve segments 17, 18) comprises at least three first tangent points. For example, the first curve segment 17 comprises first tangent points 77, 78, 79. To avoid the complexity of FIG. 9A, only two first curve segments 17, 18 and first tangent points 77, 78, 79 are shown in FIG. 9A. In this embodiment, the first curve 16 is obtained in a curve fitting manner of the first tangent points which are taken at an interval of a predetermined degree. The predetermined degree may be but not limited to 1°, which is not intended to limit the present disclosure. After passing the corresponding first tangent point, each of the plurality of first light beams 75 exits along a first axis 19. An included angle T formed between the first axis 19 and the optic axis 47 is greater than −15° and smaller than 15°, and each first tangent point satisfies a formula (4) in the following:

$$M_x = \tan\theta = \tan\left(\sin^{-1}\left(\frac{n_1}{n_2}\sin A_x\right)\right) \quad (4)$$

$M_x$ is a tangent slope (that is, tan θ) at each first tangent point, θ is an included angle formed between the first axis 19 and a normal line 57 of each first tangent point, $A_x$ is an included angle formed between a connecting line of each first tangent point of each first curve segment and the light source 10 and the optic axis 47, $n_1$ is a refractive index of the directional light distributing optical array 404, and $n_2$ is a refractive index of an ambient environment in which the directional light distributing optical array 404 is disposed. An included angle ρ formed between end points Z, D of the first curve 16 and the light source 10 may be greater than 0°, and smaller than or equal to 60°(that is, 0°<ρ≤60°).

Moreover, when the light incident surface 11 connects to the two reflective structures 13 and the two reflective structures 13 is disposed on both sides of the light incident surface 11 (that is, the light incident surface 11 is not disposed on one side of the directional light distributing optical array 404), one of the two reflective structures 13 is used to receive and reflect the plurality of second light beams 76 from the light source 10 to the light emission curved surface 12, and the light emission curved surface 12 receives and reflects the plurality of second light beams 76 from one of the two reflective structures 13 to the other reflective structures 13. The other reflective structures 13 receives and reflects the plurality of second light beams 76 from the light emission curved surface 12 to emit the plurality of second light beams 76 from the light emission curved surface 12 toward the light incident surface 11. An incident angle ϵ that each of the plurality of second light beams 76 from the light source 10 is incident to the corresponding reflect structure 13 is greater than 42°.

In this embodiment, each reflect structure 13 has an apex J, there is a first connecting line 802 between each apex J and the corresponding light source 10 which are adjacent to each other, there is a second connecting line 804 between each light source 10 and one end point of the corresponding first curve 16 (that is, end point Z or end point D), and an included angle χ formed between each first connecting line 802 and the adjacent second connecting line 804 is greater than 8°.

Figure 9B:
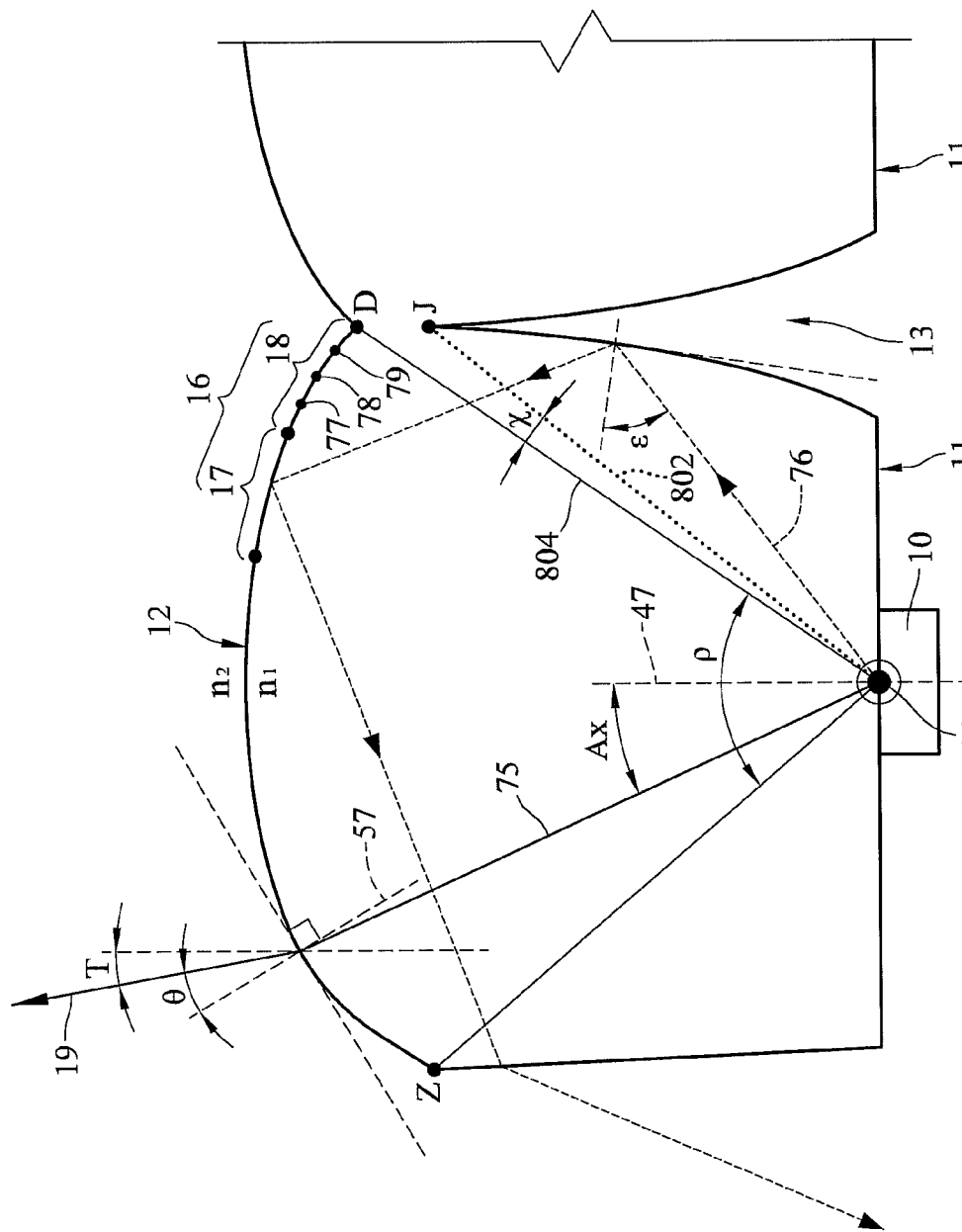
FIG. 9B is a schematic structural side view of one light source, corresponding light incident surface, corresponding light emission curved surface and corresponding reflective struture according to another embodiment of FIG. 8A.

FIG. 9B is a schematic structural side view of one light source, corresponding light incident surface, corresponding light emission curved surface and corresponding reflective struture according to another embodiment of FIG. 8A. Referring to FIG. 9B, there is only one reflect structure 13 disposed on one side of the light incident surface 11 (that is, the light incident surface 11 is disposed on one side of the directional light distributing optical array 404), the reflective structures 13 is used to receive and reflect the plurality of second light beams 76 from the light source 10 to the light emission curved surface 12, and the light emission curved surface 12 receives and reflects the plurality of second light beams 76 from the reflective structures 13 to emit the plurality of second light beams 76 from the light emission curved surface 12 toward the light incident surface 11 substantially. An incident angle ϵ that each of the plurality of second light beams 76 from the light source 10 is incident to the corresponding reflect structure 13 is greater than 42°.

In this embodiment, the reflect structure 13 has an apex J, there is a first connecting line 802 between the apex J and the corresponding light source 10 which are adjacent to each other, there is a second connecting line 804 between the light source 10 and one end point D of the corresponding first curve 16, and an included angle χ formed between each first connecting line 802 and the adjacent second connecting line 804 is greater than 8°.

Figure 9C:
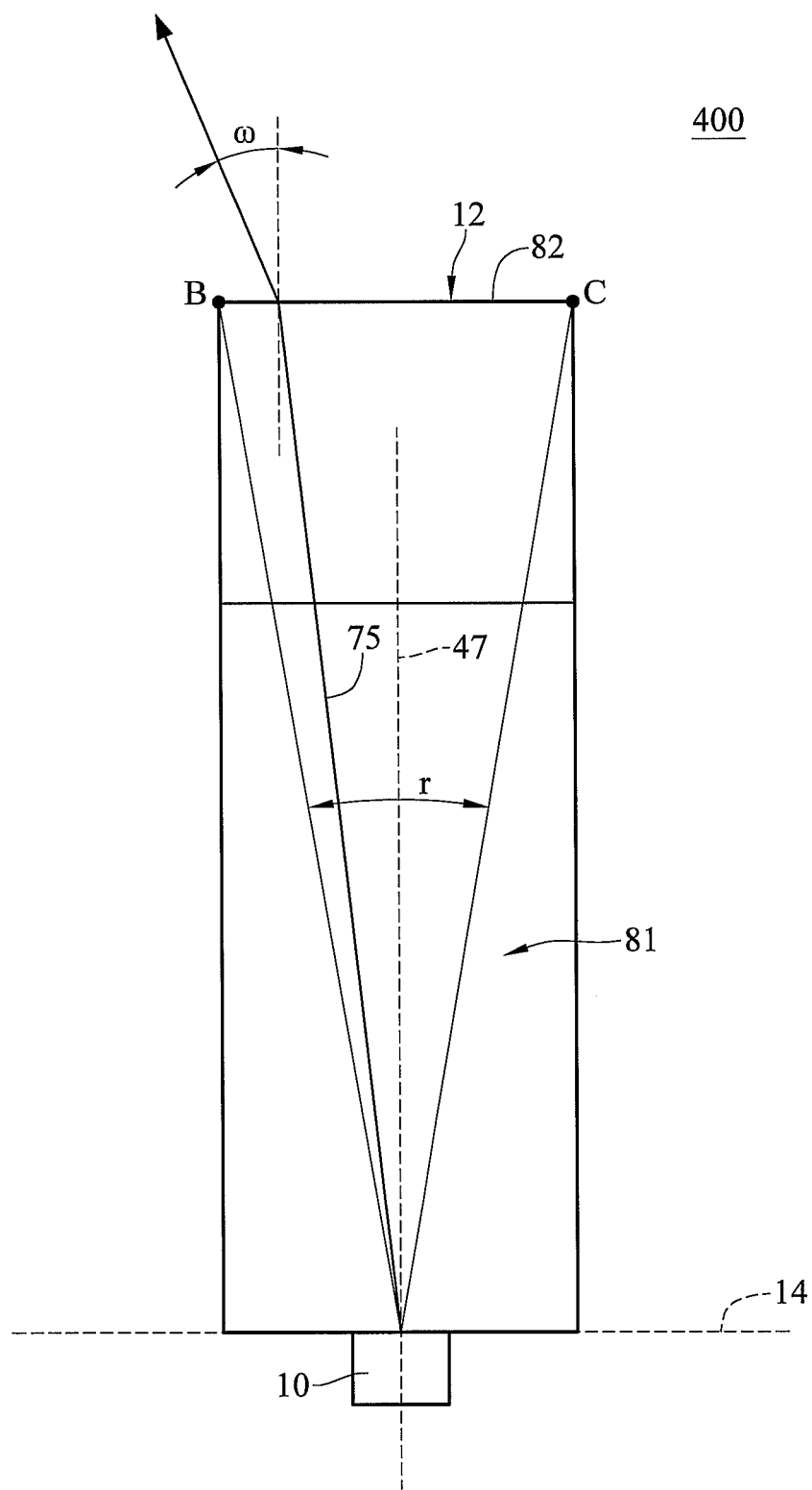
FIG. 9C is a schematic structural side view of FIG. 9A.

In this embodiment, the light emission curved surface 12 may be formed by the first curve 16 extending along the central axis 14. FIG. 9C is a schematic structural side view of FIG. 9A. Referring to FIG. 9C, the light emission curved surface 12 and a second plane 81 at which the central axis 14 is located are intersected to form a second curve 82, and an included angle γ formed between two end points B, C of the second curve 82 and the light source 10 is greater than 0° and smaller than 40°. In this embodiment, the light emission curved surface 12 may be formed by the first curve 16 (referring to FIG. 9A) extending along central axis 14, such that the second curve 82 is a straight line. Thus, an included angle ω formed between the plurality of first light beams 75 after passing through the second curve 82 and the optic axis 47 may be greater than or equal to 30°. Therefore, the plurality of first light beams 75 after passing light emission curved surface 12 may be a plurality of one-dimensional directional light distributing light. It is noted that the included angle formed between the plurality of second light beams 76 and the optic axis 47 is too large to be incident on the light emission curved surface 12. Thus, plurality of second light beams 76 is not shown in FIG. 9C.

Figure 10B:
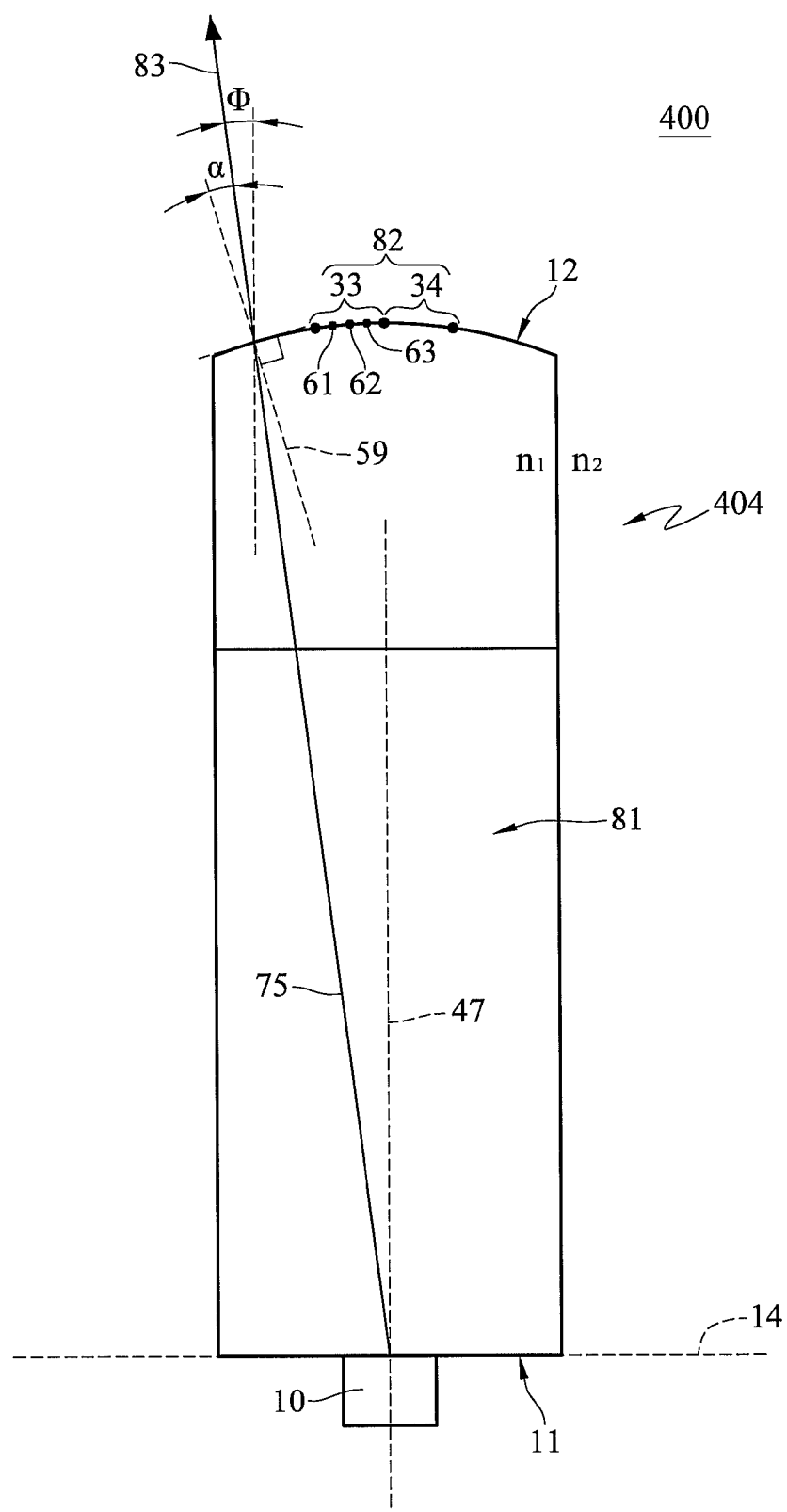
FIG. 10B is a schematic structural side view of one light source, corresponding light incident surface, corresponding light emission curved surface and corresponding reflective struture according to an embodiment of FIG. 10A.

Moreover, the second curve 82 of the light emission curved surface 12 can be processed. FIG. 10A is a schematic three-dimensional view of a directional light distributing optical module according to another embodiment, and FIG. 10B is a schematic structural side view of one light source, corresponding light incident surface, corresponding light emission curved surface and corresponding reflective struture according to an embodiment of FIG. 10A. Referring to FIG. 10A and FIG. 10B, the second curve 82 has a plurality of second curve segments 33, 34, and each second curve segment (that is, the second curve segments 33, 34) comprises at least three second tangent points. For example, the second curve segment 33 comprises second tangent points 61, 62, 63. To avoid the complexity of FIG. 10A and FIG. 10B, only two second curve segments 33, 34 and second tangent points 61, 62, 63 are shown in FIG. 10A and FIG. 10B. In this embodiment, the second curve 82 is obtained in a curve fitting manner of the second tangent points which are taken at an interval of a predetermined degree. The predetermined degree may be but not limited to 1°, which is not intended to limit the present disclosure. After passing corresponding second tangent point, the plurality of first light beams 75 exits along a second axis 83. An included angle Φ formed between the second axis 83 and the optic axis 47 is, not limited to, greater than or equal to 30°. All the tangent points on each second curve satisfy a formula (5) in the following:

$$M_y = \tan\alpha = \tan\left(\sin^{-1}\left(\frac{n_1}{n_2}\sin A_y\right)\right) \quad (5)$$

M$_y$ is a tangent slope (that is, tan α) at each second tangent point on the second curve 82, α is an included angle formed between the second axis 83 and a normal line 59 of each second tangent point, A$_y$ is an included angle formed between the optic axis 47 and a connecting line of each second tangent point on the second curve 82 and the light source 10, n$_1$ is a refractive index of the directional light distributing optical array 404, and n$_2$ is a refractive index of an ambient environment in which the directional light distributing optical array 404 is disposed.

Figure 11A:
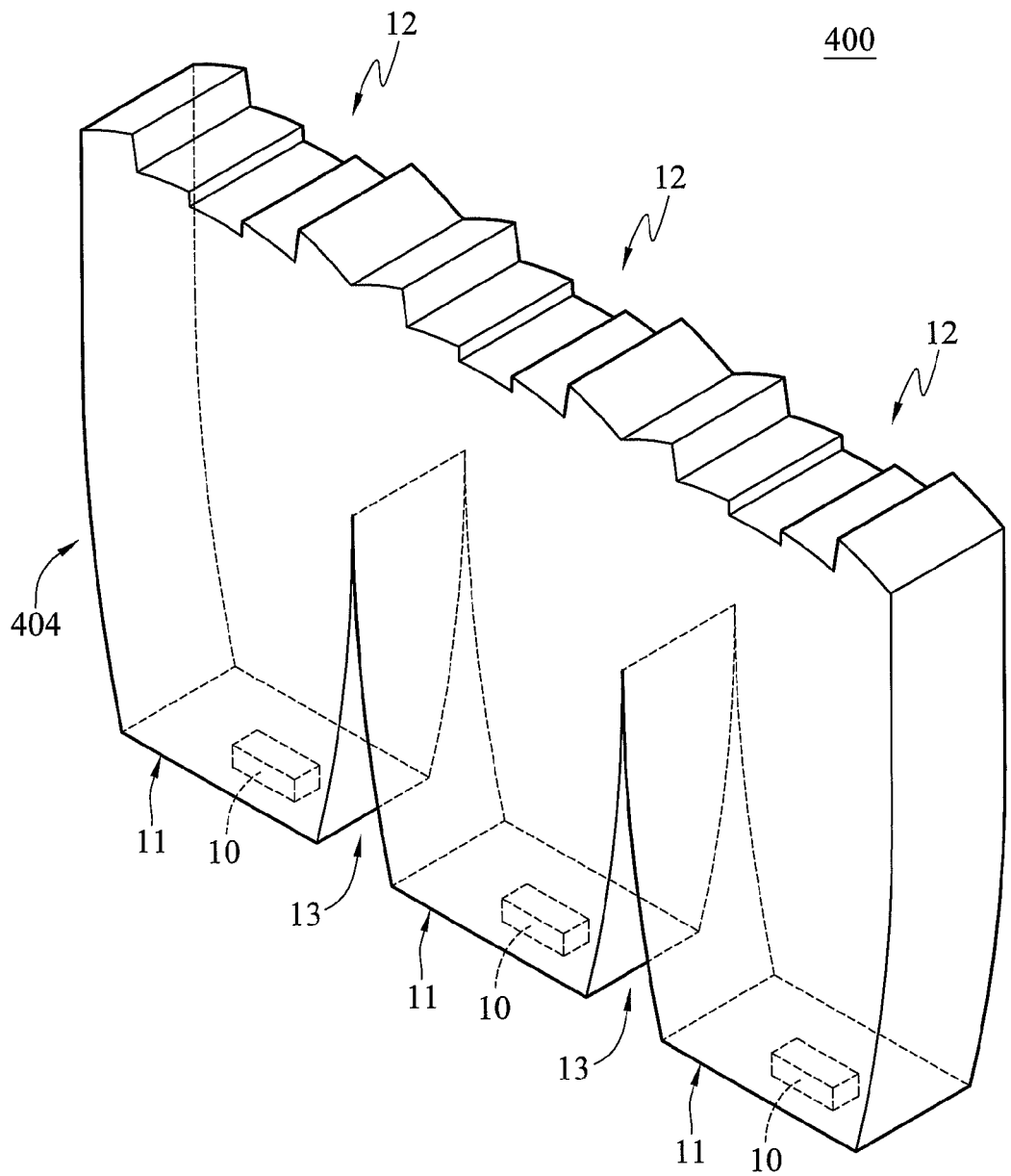
FIG. 11A is a schematic three-dimensional view of a directional light distributing optical module according to an alternative embodiment.

Furthermore, to reduce the size of the directional light distributing optical array 404, the directional light distributing optical array 404 may be designed into the Fresnel lens shape. The detailed description may refer to FIG. 11A, and FIG. 11B, which are respectively a schematic three-dimensional structural view of a directional light distributing optical assembly according to an alternative embodiment, and a schematic structural side view of one light source, corresponding light incident surface, corresponding light emission curved surface and corresponding reflective struture according to an embodiment of FIG. 11A. In this embodiment, the first curve 16 comprises first curve segments 202, 203, 204, 205, 206, and each first curve segment (that is, the first curve segments 202, 203, 204, 205, 206) comprises at least three first tangent points. For example, the first curve segment 202 comprises first tangent points I$_1$, I$_2$, I$_3$ (to avoid the complexity of the drawings, the first tangent points on the first curve segments 203, 204, 205, 206 are not marked in FIG. 11B). After passing each first tangent point along a connecting line of the light source 10 and each first tangent point, the plurality of first light beams 75 exits along the first axis 502. The included angle γ' formed between the first axis 502 and the optic axis 64 is greater than −15° and smaller than 15°, and each first tangent point satisfies a formula (6) in the following:

$$M'_x = \tan\beta = \tan\left(\sin^{-1}\left(\frac{n_1}{n_2}\sin A'_x\right)\right) \quad (3)$$

M'$_x$ is a tangent slope (that is, tan β) at each first tangent point, β is an included angle formed between a first axis 502 and a normal line 46 of each first tangent point, A'$_x$ is an included angle formed between the optic axis 64 and a connecting line of each first tangent point and the light source 10, n$_1$ is a refractive index of the directional light distributing optical array 404, and n$_2$ is a refractive index of an ambient environment in which the directional light distributing optical array 404 is disposed. An included angle μ formed between end points Q$_1$, Q$_6$ of the first curve 16 and the light source 10 may be greater than 0°, and smaller than or equal to 60° (that is, 0°<μ≤60°).

The included angle between the connecting lines of two end points of each first curve segment and the light source 10 is greater than 0° and smaller than 15°. That is to say, the included angle between connecting lines of end points Q$_1$, T$_1$ of the first curve segment 202 and the light source 10 is 6°, the included angle between connecting lines of end points Q$_2$, T$_2$ of the first curve segment 203 and a light source 10 is 6°, the included angle between the connecting lines of end points Q$_3$, Q$_4$ of the first curve segment 204 and the light source 10 is 6°, the included angle between the connecting lines of end points T$_3$, Q$_5$ of the first curve segment 205 and the light source 10 is 6°, and the included angle between the connecting lines of end points T$_4$, Q$_6$ of the first curve segment 206 and the light source 10 is 6°, which is not intended to limit the present disclosure. In practice, the included angle between the connecting lines of two end points of each first curve segment and the light source 10 may be adjusted according to the actual requirement. It should be noted that an included angle μ formed between end points Q$_1$, Q$_6$ of the first curve 16 and the light source 10 may be greater than 0°, and smaller than or equal to 60° (that is, 0°<μ≤60°).

In this embodiment, the first curve 16 may further comprise connecting segments 212, 213, 214, 215, and each connecting segment (that is, the connecting segments 212, 213, 214, 215) connects two adjacent first curve segments. That is to say, the connecting segment 212 connects the first curve segment 202 and the first curve segment 203 (that is, the end points T$_1$ and Q$_2$). The connecting segment 213 connects the first curve segment 203 and the first curve segment 204 (that is, the end points T$_2$ and Q$_3$). The connecting segment 214 connects the first curve segment 204 and the first curve segment 205 (that is, the end points T$_3$ and Q$_4$). The connecting segment 215 connects the first curve segment 205 and the first curve segment 206 (that is, the end points T$_4$ and Q$_5$). Each connecting segment (that is, the connecting segments 212, 213, 214, 215) is substantially parallel to the connecting line of an end point of each connecting segment (that is, the connecting segments 212, 213, 214, 215) and the light source 10. In other words, the connecting segment 212 is substantially parallel to the connecting line of the end point Q$_2$ and the light source 10. The connecting segment 213 is substantially parallel to the connecting line of the end point Q$_3$ and the light source 10. The connecting segment 214 is substantially parallel to the connecting line of the end point Q$_4$ and the light source 10. The connecting segment 215 is substantially parallel to the connecting line of the end point Q$_4$ and the light source 10.

Figure 11B:
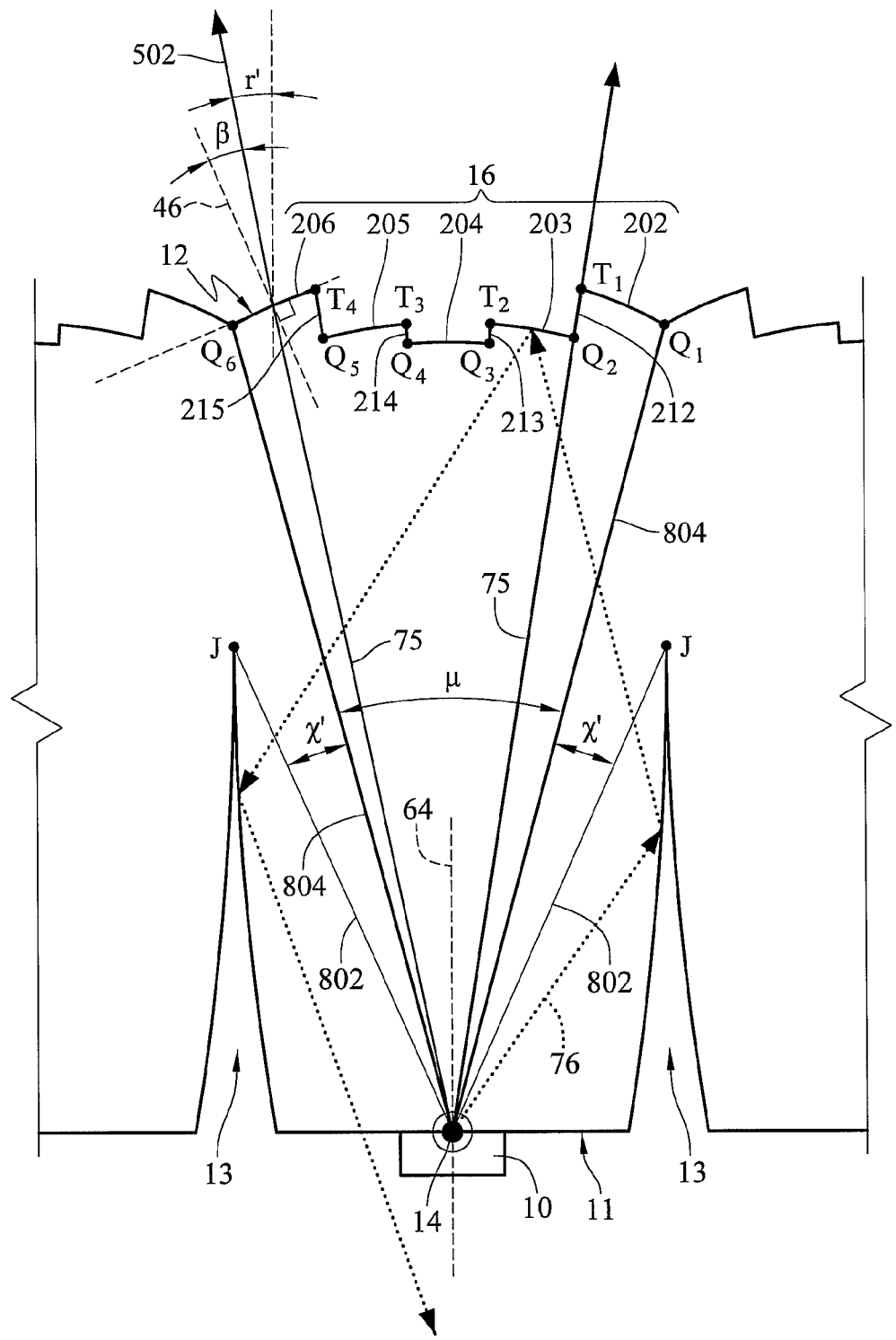
FIG. 11B is a schematic structural side view of one light source, corresponding light incident surface, corresponding light emission curved surface and corresponding reflective struture according to an embodiment of FIG. 11A.

Moreover, referring to FIG. 11B, the light incident surface 11 connects to the two reflective structures 13 and the two reflective structures 13 is disposed on both sides of the light incident surface 11 (that is, the light incident surface 11 is not disposed on one side of the directional light distributing optical array 404), one of the two reflective structures 13 is used to receive and reflect the plurality of second light beams 76 from the light source 10 to the light emission curved surface 12, and the light emission curved surface 12 receives and reflects the plurality of second light beams 76 from one of the two reflective structures 13 to the other reflective structures 13. The other reflective structures 13 receives and reflects the plurality of second light beams 76 from the light emission curved surface 12 to emit the plurality of second light beams 76 from the light emission curved surface 12 toward the light incident surface 11. An incident angle ε' that each of the plurality of second light beams 76 from the light source 10 is incident to the corresponding reflect structure 13 is greater than 42°.

In this embodiment, each reflect structure 13 has an apex J, there is a first connecting line 802 between each apex J and the corresponding light source 10 which are adjacent to each other, there is a second connecting line 804 between each light source 10 and one end point of the corresponding first curve 16 (that is, end point Q$_6$ or end point Q$_1$), and an included angle χ' formed between each first connecting line 802 and the adjacent second connecting line 804 is greater than 8°.

The material of the directional light distributing optical array 404 may be Polyethylene terephthalate (PET), Polymethyl methacrylate (PMMA), Poly-Styrenics (PS), Poly Carbonate (PC), or glass, and may also be adjusted according to the actual requirement.

The directional light distributing optical array and the directional light distributing optical module according to the above-mentioned embodiments may use the design of the plurality of light emission curved surfaces to make the plurality of first light beams emitted by the plurality of light sources passes the directional light distributing optical array and then generate a one-dimensional directional distributed light. The directional light distributing optical array and the directional light distributing optical module according to the above-mentioned embodiments may use the design of the plurality of light emission curved surfaces and the plurality of reflective structures to make the plurality of second light beams emitted by the plurality of light sources reflected by the plurality of light emission curved surfaces and the plurality of reflective structures be emitted toward the plurality of light incident surfaces. Thus, the plurality of second light beams which is not a directional distributed light is not emitted from the plurality of light emission curved surfaces. The plurality of light emission curved surfaces is designed into the Fresnel lens to reduce the volume of the directional light distributing optical array, such that the directional light distributing optical module may be applied to the small devices. The directional light distributing optical module according to the present disclosure is applicable to the new LCD architecture, and is also applicable to display devices which have a high requirement for light source collimation, such as a 3D display and a dual-view display.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A directional light distributing optical array, for receiving a plurality of first light beams and a plurality of second light beams emitted by a plurality of light sources, wherein each light source comprises an optic axis, the directional light distributing optical array arranged along a first plane comprising:

a plurality of light incident surfaces, wherein each light incident surface comprises a central axis and individually receives the plurality of first light beams and the plurality of second light beams emitted by at least one light source;

a plurality of light emission curved surfaces, wherein each light emission curved surface is intersected with the first plane being vertical to the central axes to form a first curve, each first curve has a plurality of first curve segments, each first curve segment comprises at least three first tangent points, and after passing a corresponding first tangent point, each of the plurality of first light beams exits along a first axis, an included angle formed between the first axis and the optic axis is greater than −15° and smaller than 15°, and wherein each first tangent point satisfies a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, $\theta$ is an included angle formed between the first axis and a normal line of each first tangent point, $A_x$ is an included angle formed between a connecting line of each first tangent point and a corresponding light source and a corresponding optic axis, $n_1$ is a refractive index of the directional light distributing optical array, and $n_2$ is a refractive index of an ambient environment in which the directional light distributing optical array is disposed; and a plurality of reflective strutures, each formed between the two light incident surfaces which are adjacent to each other, the plurality of reflective structures being used to receive and reflect the plurality of the second light beams from the plurality of light sources to the plurality of light emission curved surfaces, wherein the plurality of light emission curved surfaces receives and reflects the plurality of the second light beams from the plurality of reflective strutures toward the plurality of light incident surfaces.

2. The directional light distributing optical array according to claim 1, wherein an included angle formed between connecting lines of two end points of each first curve segment and the corresponding light source is greater than 0° and smaller than 15°.

3. The directional light distributing optical array according to claim 1, wherein the plurality of light emission curved surfaces is formed by the first curves extending along the central axes.

4. The directional light distributing optical array according to claim 1, wherein an included angle formed between two end points of each first curve and the corresponding light source is greater than 0°, and smaller than or equal to 60°.

5. The directional light distributing optical array according to claim 1, wherein there are a plurality of second planes, each second plane contains one of the central axes, each of the plurality of light emission curved surfaces intersects one of the plurality of second planes to form a second curve, an included angle formed between two end points of each second curve and the corresponding light source is greater than 0° and smaller than 40°, and the plurality of light emission curved surfaces is formed by the first curves extending along the central axes, such that each second curve is a straight line.

6. The directional light distributing optical array according to claim 5, wherein an included angle formed between each of the plurality of first light beams after passing a corresponding second curve and the corresponding optic axis is greater than or equal to 30°.

7. The directional light distributing optical array according to claim 1, wherein there are a plurality of second planes, each second plane contains one of the central axes, each of the plurality of light emission curved surfaces intersects one of the plurality of second planes to form a second curve, an included angle formed between two end points of each second curve and the corresponding light source is greater than 0° and smaller than 40°, each second curve has a plurality of second curve segments, each second curve segment comprises at least three second tangent points, and after passing the corresponding second tangent point, each of the plurality of first light beams exits along a second axis, and wherein each second tangent point satisfies a formula in the following:

$$M_y = \tan\alpha = \tan\left(\sin^{-1}\left(\frac{n_1}{n_2}\sin A_y\right)\right)$$

wherein $M_y$ is a tangent slope at each second tangent point, $\alpha$ is an included angle formed between the second axis and a normal line of each second tangent point, $A_y$ is an included angle formed between a connecting line of each second tangent point and the corresponding light source and the corresponding optic axis, $n_1$ is a refractive index of the directional light distributing optical array, and $n_2$ is a refractive index of an ambient environment in which the directional light distributing optical array is disposed.

8. The directional light distributing optical array according to claim 7, wherein an included angle formed between each second axis and the corresponding optic axis is greater than or equal to 30°.

9. The directional light distributing optical array according to claim 1, wherein each first curve comprises a plurality of connecting segments, each connecting segment of each first curve connects two adjacent first curve segments, and each connecting segment of each first curve is substantially parallel to a connecting line of an end point of each connecting segment of each first curve and the corresponding light source.

10. The directional light distributing optical array according to claim 1, wherein an incident angle that each of the plurality of second light beams from the light sources is incident to a corresponding reflective structure is greater than 42°.

11. The directional light distributing optical array according to claim 1, wherein each of the plurality of reflective structures has an apex, there is a first connecting line between each apex and the corresponding light source which are adjacent to each other, there is a second connecting line between each light source and one end point of the corresponding first curve, and an included angle formed between each first connecting line and the adjacent second connecting line is greater than 8°.

12. A directional light distributing optical module, comprising:
a plurality of light sources, wherein each light source is used to emit a plurality of first light beams and a plurality of second light beams, and comprises an optic axis; and
a directional light distributing optical array arranged along a first plane, comprising:
a plurality of light incident surfaces, wherein each light incident surface comprises a central axis and individually receives the plurality of first light beams and the plurality of second light beams emitted by at least one of the plurality of light sources;
a plurality of light emission curved surfaces, wherein each light emission curved surface is intersected with the first plane being vertical to the central axes to form a first curve, each first curve has a plurality of first curve segments, each first curve segment comprises at least three first tangent points, and after passing a corresponding first tangent point, each of the plurality of first light beams exits along a first axis, an included angle formed between the first axis and the optic axis is greater than −15° and smaller than 15°, and wherein each first tangent point satisfies a formula in the following:

$$M_x = \tan\theta = \tan\left(\sin^{-1}\left(\frac{n_1}{n_2}\sin A_x\right)\right)$$

wherein $M_x$ is a tangent slope at each first tangent point, $\theta$ is an included angle formed between the first axis and a normal line of each first tangent point, $A_x$ is an included angle formed between a connecting line of each first tangent point and a corresponding light source and a corresponding optic axis, $n_1$ is a refractive index of the directional light distributing optical array, and $n_2$ is a refractive index of an ambient environment in which the directional light distributing optical array is disposed; and
a plurality of reflective strutures, each formed between the two light incident surfaces which are adjacent to each other, the structures being used to receive and reflect the plurality of the second light beams from the plurality of light sources to the plurality of light emission curved surfaces, wherein the plurality of light emission curved surfaces receives and reflects the plurality of the second light beams from the plurality of reflective strutures toward the plurality of light incident surfaces.

* * * * *